(12) United States Patent
Van Beek

(10) Patent No.: US 9,613,295 B1
(45) Date of Patent: Apr. 4, 2017

(54) EDGE BASED LOCATION FEATURE INDEX MATCHING

(71) Applicant: Sharp Laboratories of America, Inc., Camas, WA (US)

(72) Inventor: Petrus J. L. Van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/990,728

(22) Filed: Jan. 7, 2016

(51) Int. Cl.
*G06K 9/34* (2006.01)
*G06K 9/62* (2006.01)
(Continued)

(52) U.S. Cl.
CPC ........... *G06K 9/6204* (2013.01); *G06K 9/342* (2013.01); *G06K 9/4638* (2013.01); *G06K 9/52* (2013.01);
(Continued)

(58) Field of Classification Search
CPC ........... G06K 9/00409; G06K 9/00416; G06K 9/00523; G06K 9/0061; G06K 9/0014; G06K 9/00187; G06K 9/00194; G06K 9/00744; G06K 9/4671; G06K 9/4674; G06K 9/4633; G06K 9/4638; G06K 9/3208; G06K 9/3275; G06K 9/34; G06K 9/342; G06K 9/48; G06K 9/52; G06K 9/46; G06K 9/4604; G06K 9/6202; G06K 9/6203; G06K 9/6204; G06K 9/6205; G06K 9/6217; G06K 9/6228; G06K 9/6276; G06K 9/6278; G06K 9/6232; G06K 9/6234; G06T 7/004; G06T 7/0042; G06T 7/0044; G06T 7/0079; G06T 7/0083; G06T 7/0081; G06T 7/0085; G06T 7/2033; G06T 7/403; G06T 9/20; G06T 2207/20136; G06T 2207/10116; G06F 17/3087; H04N 1/00721; H04N 1/00809; H04N 1/14; H04N 1/3224; H04N 1/32203; H04N 1/409; H04N 1/4092; H04N 1/58; H04N 5/2628; H04N 7/30; H04N 7/50; H04N 19/14; H04N 19/33; H04N 19/428; H04N 19/59; H04N 19/593; H04N 2201/3254
See application file for complete search history.

(56) References Cited

U.S. PATENT DOCUMENTS 8,483,489 B2 * 7/2013 Van Beek ............ G06K 9/6204
382/103
8,774,510 B2 * 7/2014 Xu ........................ G06K 9/3275
382/170
(Continued)

FOREIGN PATENT DOCUMENTS

EP 1693783 A1 8/2006

OTHER PUBLICATIONS

A. Sibiryakov, "Fast and High-Performance Template Matching Method," IEEE CVPR, 2011, 8 pgs.
(Continued)

*Primary Examiner* — Jose Couso
(74) *Attorney, Agent, or Firm* — Chernoff Vilhauer McClung & Stenzel, LLP

(57) ABSTRACT

A system for image processing that matches a model image with an input image. The matching process includes using a feature location index for the model image.

13 Claims, 27 Drawing Sheets

(51) Int. Cl.
*G06K 9/46* (2006.01)
*G06K 9/52* (2006.01)

(52) U.S. Cl.
CPC ......... *G06K 9/6276* (2013.01); *G06K 9/6278* (2013.01); *G06K 2009/6213* (2013.01)

(56) References Cited

U.S. PATENT DOCUMENTS

| | | | |
|---|---|---|---|
| 8,867,844 B2* | 10/2014 | Van Beek | G06K 9/6211 382/199 |
| 9,269,023 B2* | 2/2016 | Seo | |
| 2011/0222766 A1 | 9/2011 | Kato et al. | |
| 2012/0082385 A1* | 4/2012 | Xu | G06K 9/6857 382/199 |

OTHER PUBLICATIONS

S. Hinterstoisser et al., "Dominant Orientation Templates for Real-Time Detection of Texture-Less Objects," IEEE CVPR 2010, 8 pgs.
Dalal, et al., "Histograms of Oriented Gradients for Human Detection," IEEE, 2005, 8 pgs.

* cited by examiner

TEMPLATE MATCHING model image · example input image · example output image

| INDEX | ANGULAR RANGE | BIT PATTERN |
|---|---|---|
| 0 | NON-EDGE | 00000000 |
| 1 | -15 to +15 | 00000010 |
| 2 | +15 to +45 | 00000100 |
| 3 | +45 to +75 | 00001000 |
| 4 | +75 to +105 | 00010000 |
| 5 | +105 to +135 | 00100000 |
| 6 | +135 to +165 | 01000000 |
| 7 | NOT USED | 00000000 |

FIG. 8

| INDEX | ANGULAR RANGE | BIT PATTERN |
|---|---|---|
| 0 | NON-EDGE | 00000000 |
| 1 | -15 to +15 | 01000110 |
| 2 | +15 to +45 | 00001110 |
| 3 | +45 to +75 | 00011100 |
| 4 | +75 to +105 | 00111000 |
| 5 | +105 to +135 | 01110000 |
| 6 | +135 to +165 | 01100010 |
| 7 | NOT USED | 00000000 |

FIG. 9

0 DEGREE TEMPLATE

30 DEGREE TEMPLATE

60 DEGREE TEMPLATE

90 DEGREE TEMPLATE

120 DEGREE TEMPLATE

150 DEGREE TEMPLATE

400

| 0 | 0 | 1 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 3 | 0 | 0 | 0 | 1 | 0 | 0 | 0 | 0 | 1 | 0 | 0 | 0 |
| 0 | 0 | 0 | 0 | 0 | 0 | 1 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 1 | 0 | 1 | 0 | 0 | 0 | 0 |
| 0 | 0 | 0 | 1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

FIG. 23

EDGE BASED LOCATION FEATURE INDEX MATCHING

CROSS-REFERENCE TO RELATED APPLICATIONS

None.

BACKGROUND OF THE INVENTION

The present invention relates generally to template matching for an image.

Referring to FIG. 1, template matching is a commonly used technique in order to recognize content in an image. The template matching technique includes a given target object in a model image, automatically finding the position, orientation, and scaling of the target object in input images. Generally, the input images undergo geometric transforms (rotation, zoom, etc) and photometric changes (brightness/contrast changes, blur, noise, etc). In the context of template matching, the relevant characteristics of the target object in the model image may be assumed to be known before the template matching to the target image is performed. Such characteristics of the target object may be extracted, modeled, and learned previously in a manner that may be considered "off-line," while the matching of those characteristics to the input image may be considered "on-line."

One of the template matching techniques includes feature point based template matching which achieves good matching accuracy. Feature point based template matching extracts object discriminative interesting points and features from the model and the input images. Then those features are matched between the model image and the input image with K-nearest neighbor search or some feature point classification technique. Next a homography transformation is estimated from those matched feature points, which may further be refined.

Feature point based template matching works well when objects contain a sufficient number of interesting feature points. It typically fails to produce a valid homography when the target object in the input or model image contains few or no interesting points (e.g. corners), or the target object is very simple (e.g. target object consists of only edges, like paper clip) or symmetric, or the target object contains repetitive patterns (e.g. machine screw). In these situations, too many ambiguous matches prevents generating a valid homography. To reduce the likelihood of such failure, global information of the object such as edges, contours, or shape may be utilized instead of merely relying on local features.

Another category of template matching is to search the target object by sliding a window of the reference template in a pixel-by-pixel manner, and computing the degree of similarity between them, where the similarity metric is commonly given by correlation or normalized cross correlation. Pixel-by-pixel template matching is very time-consuming and computationally expensive. For an input image of size N×N and the model image of size W×W, the computational complexity is $O(W^2 \times N^2)$, given that the object orientation in both the input and model image is coincident. When searching for an object with arbitrary orientation, one technique is to do template matching with the model image rotated in every possible orientation, which makes the matching scheme far more computationally expensive. To reduce the computation time, coarse-to-fine, multi-resolution template matching may be used.

What is desired therefore is a computationally efficient edge based matching technique.

The foregoing and other objectives, features, and advantages of the invention may be more readily understood upon consideration of the following detailed description of the invention, taken in conjunction with the accompanying drawings.

BRIEF DESCRIPTION OF THE SEVERAL VIEWS OF THE DRAWINGS

FIG. 8 illustrates a bit pattern for different angles.
FIG. 9 illustrates another bit pattern for different angles.
FIG. 23 illustrates accumulated matching scores.

DETAILED DESCRIPTION OF PREFERRED EMBODIMENT

Figure 1:
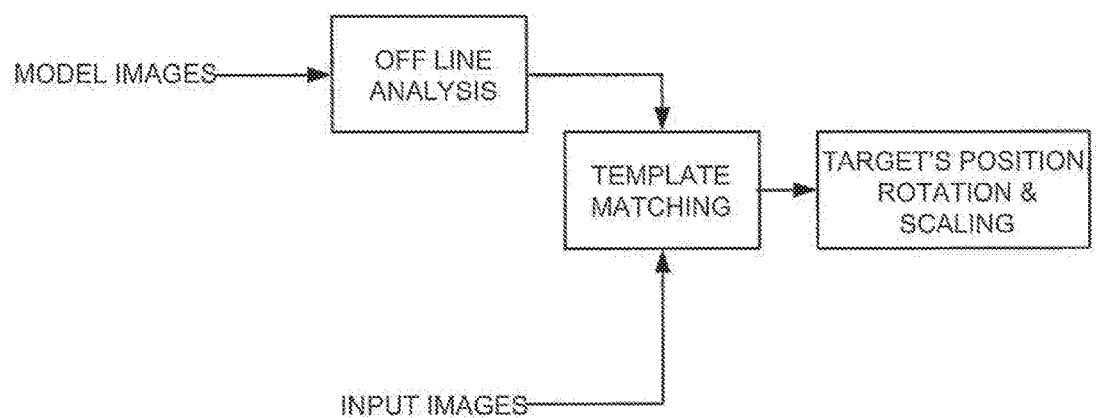
FIG. 1 illustrates template matching.
Figure 2:
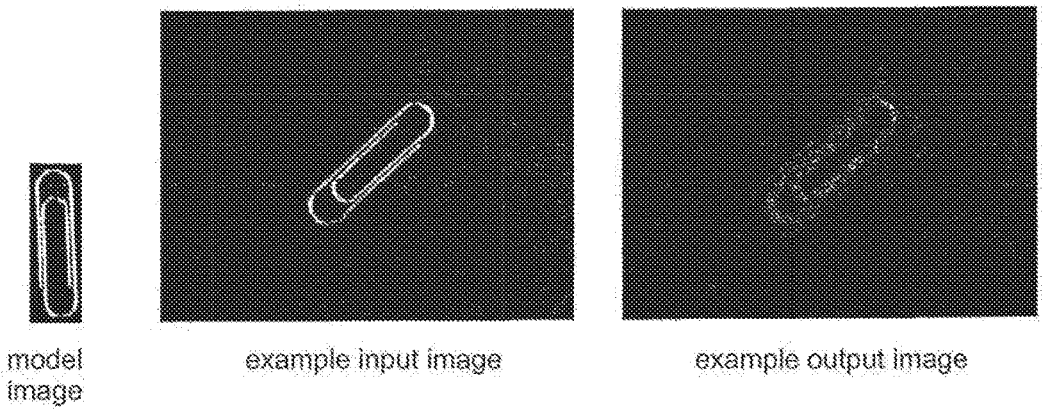
FIG. 2 illustrates a model image, an input image, and an output image.

Referring to FIG. 2, in many cases a model image has a limited set of feature points but tends to have relatively sharp edge features. One such example is a paperclip. Then using a suitable matching technique it is desirable to find a matching object in one or more input images, in a computationally efficient manner. The matching object may be at an unknown position and at an unknown rotation.

Figure 3:
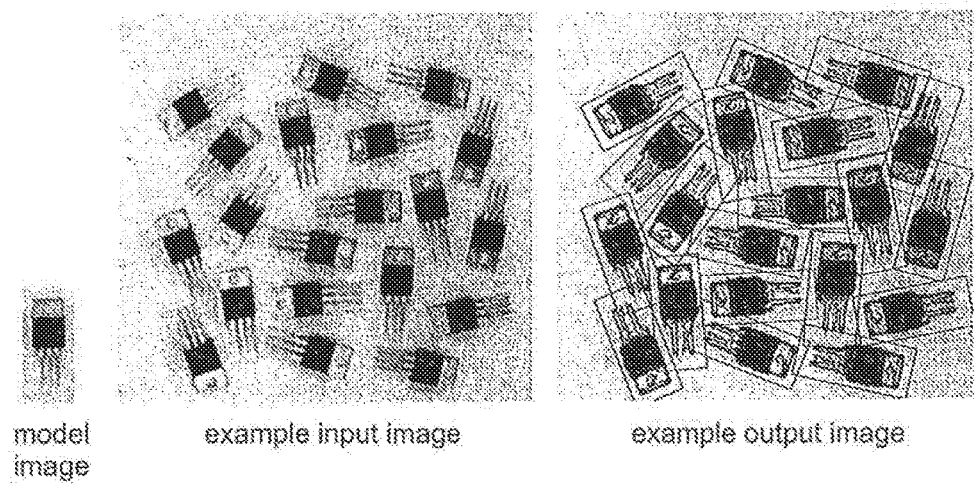
FIG. 3 illustrates another model image, an input image, and an output image.

Referring to FIG. 3, in many cases the input image may have one or more matching objects of interest, which may be overlapping with one another. Then using a suitable matching technique it is desirable to find matching objects in one or more input images, in a computationally efficient manner. The matching objects may be at an unknown position and at an unknown rotation.

Figure 4:
FIG. 4 illustrates another model image, an input image, and an output image.
Figure 4:
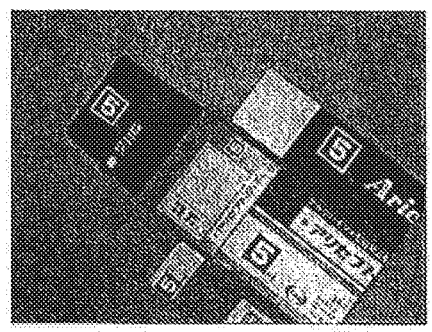
Figure 4:
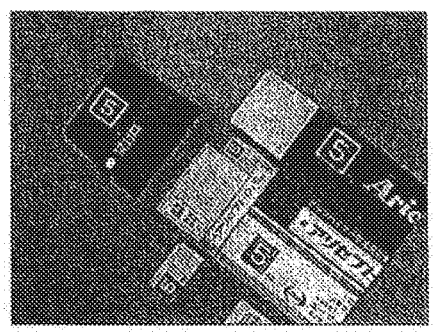

Referring to FIG. 4, in many cases the input image may have one or more matching objects of interest, which may be overlapping with one another. Then using a suitable matching technique it is desirable to find matching objects in one or more input images, in a computationally efficient manner. The matching object may be at an unknown position, unknown rotation, and unknown scale.

Referring again to FIG. 2, FIG. 3, and FIG. 4, the matching technique should be computationally efficient, while being sufficiently robust to distinguish image features such as sharp corners, significant edges, or distinguish images with relatively few such features. Moreover, the matching technique should be sufficiently robust to reduce effects due to lighting or illumination changes in the image, blur in the image, noise in the image, and other imaging imperfections. Also, the matching technique should be sufficiently robust to be tolerant to partial occlusions of the object or missing parts of the object in the input image.

Figure 5:
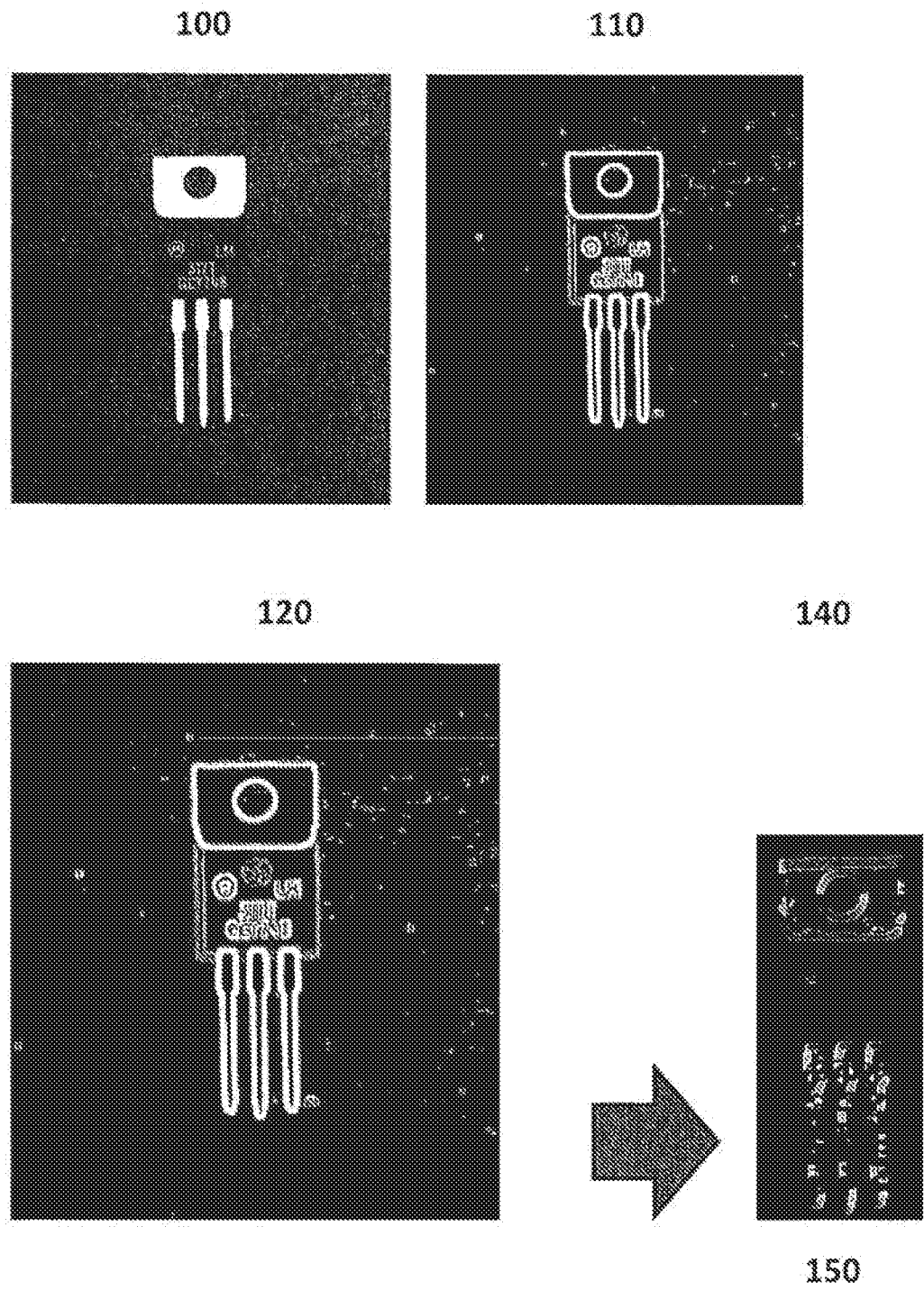
FIG. 5 illustrates an image matching technique.

Referring to FIG. 5, a model image 100 may be received by the system. A preferred technique to determine regions of the model image 100 that are likely to be of interest for image matching is to use an edge based technique 110 to locate edges of the model image. For example, one way to determine the edges 110 is to use a gradient based technique. Edge based techniques are generally robust, generally invariant to lighting changes, generally invariant to illumination changes, generally noise resistant, and generally may be implemented in a computationally efficient manner. For each of the pixels determined to be an edge pixel, the orientation of the edge 120 may be determined. For example, the orientation 120 at each edge pixel may be determined to have an orientation from 0 to 179 degrees (e.g., less than 360 degrees), such as in one degree increments. The orientation may be a full 360 degrees, if desired. The edge orientation 120 therefore preferably includes information regarding the alignment of the edge, but not its particular direction. To increase the invariance of the technique, the edge orientation 120 is preferably defined in a range of generally 180 degrees (e.g., less than 360 degrees). In this manner, the direction of an edge may be either in one direction (e.g., north) or the opposite direction (e.g., south), but the system is agnostic as to which particular direction. This manner of edge orientation characterization results in a system that is more invariant to contrast inversions.

A pixel resolution template 140 may be determined based upon the edge orientations 120. The pixel resolution template 140 may have 180 degrees of angular information at one degree increments (or some other suitable angular increment) at each of the edge pixel locations. Processing input images based only upon the "high resolution" pixel resolution template is computationally inefficient due to the high angular resolution and the high spatial resolution of the pixel resolution template. To increase the computational efficiency of the system, one or more additional quantized angular templates and/or spatial templates based upon the pixel resolution template 140 are preferably utilized.

Figure 6:
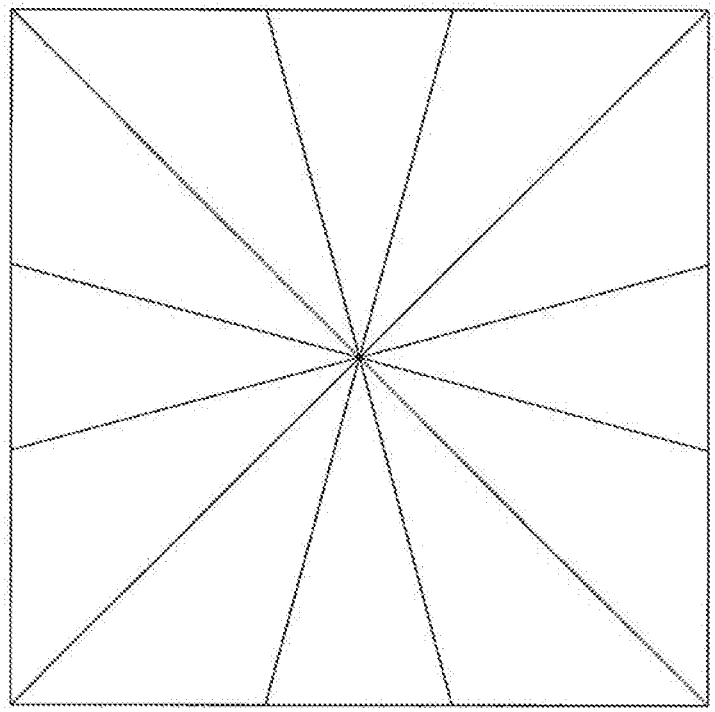
FIG. 6 illustrates a plurality of angular orientations.

Referring to FIG. 6, the edge orientations 120 may be quantized, such as, for example, into one of a set of six orientations, such as −15 to +15 degrees, +15 to +45 degrees, +45 to +75 degrees, +75 to +105 degrees, +105 to +135 degrees, and +135 to +165 degrees. The other opposing six orientations may not need to be determined because the system is preferably directionally invariant. Accordingly, each pixel of the pixel template 140 may be categorized as being within one of the six orientations forming an overall lower angular resolution template 150.

Figure 7:
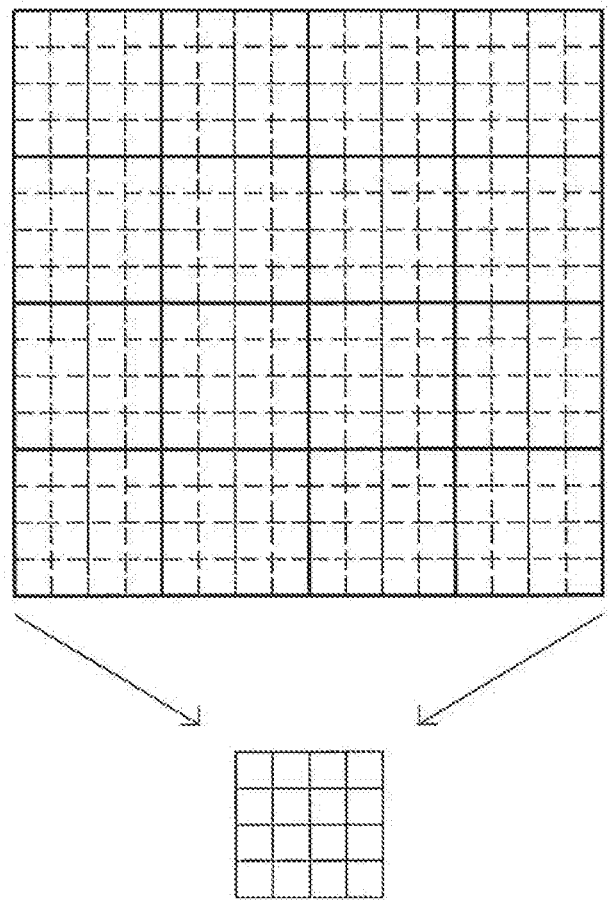
FIG. 7 illustrates pixel blocks of an image.

Referring to FIG. 7, to further increase the computational efficiency of the system, a lower spatial resolution template based upon the lower angular resolution template 150 may be defined by combing groups of pixels, including their angular orientations, into a combined angular direction at a lower resolution. The lower angular resolution template 150 may be modified in a manner to provide lower spatial resolution. For example, each block of 4×4 pixels of the lower angular resolution template may be combined to indicate a single direction and/or multiple directions. For each block of pixels, the frequency of the occurrence of each orientation may be arranged in a rank order. As an alternative, the orientations of the pixels in a block may be arranged in a rank order based on their associated edge strength and/or gradient magnitude. Then the top four occurrences (or other suitable number) of the ranked orientations may be selected as those orientations representative of those in the block. For example, if there are four different orientations then each of them may be selected. For example, if there are three orientations that are the same and a fourth orientation that is different, then the representative orientations may be the two different orientations. Likewise, the edge strength and/or gradient magnitude may be used as a basis for ranking. Other than being used as a basis of ranking to select the orientations, the frequency of the orientations (number of pixels having the same quantized orientation) is preferably not represented in the lower spatial resolution template.

Referring to FIG. 8, to further increase the computational efficiency, the template may be encoded using a set of bytes, with bits of each byte being representative of an angular orientation. For example, the first bit may be representative of a first angular orientation of the six orientations. For example, the second bit may be representative of a second angular orientation of the six orientations. For example, the third bit may be representative of a third angular orientation of the six orientations. For example, the fourth bit may be representative of a fourth angular orientation of the six orientations. For example, the fifth bit may be representative of a fifth angular orientation of the six orientations. For example, the sixth bit may be representative of a sixth angular orientation of the six orientations. As previously noted, the angular orientations are preferably offset from horizontal and vertical, such as −15 degrees to +15 degrees, +15 degrees to +45 degrees, +45 degrees to +75 degrees, +75 degrees to +105 degrees, +105 degrees to +135 degrees, and +135 degrees to +165 degrees. Often the angular orientation of the object within the input image tends to have either vertical and/or horizontal edges, and generally centering those horizontal and/or vertical angular relationships within a range of angles (e.g., −15 to +15) tends to make the system more robust to slight angular modifications. With the potential angular relationships of groups of pixels being represented by bytes, the system can perform computationally efficient pattern matching.

Referring to FIG. 9, in some cases it is desirable to include more robustness in the orientation of the angular determination for a particular pixel to reduce the effects of compared angles being on opposing sides of the quantized angular boundaries. For example, the model image may have an angle of 44 degree (bit pattern 00000100). However, the input image may have a local orientation angle of the same part of the object that was 46 degrees due to noise or other small changes. Then the angle of the input image would be quantized and given a bit pattern of 00001000. The angle codes would not match one another, even though there was only a very small difference in the orientation angle. In such cases with minor variations in the angle, the orientation of the angular determination between an input image and a model template may appear to be significant, while possibly only being different by a couple of degrees (e.g., 44 degrees and 46 degrees). To reduce this likelihood, the bit patterns of the model template may be broadened to include adjoining angular regions. Accordingly, if the bit pattern of the model image was modified to include both sides of the quantized region, namely, 00001110, then the pixel region of the input image having a bit pattern of 00001000 would have overlap and thus be matched. In this manner, the matching would be more robust, although slightly less discriminative. This approach may be refined and extended using additional bit patterns. In particular, a bit pattern may be broadened on only one side of the quantized region, instead of both sides. Furthermore, the decision to broaden a bit pattern may be based on the proximity of the actual orientation angle to the quantization boundary.

Figure 10:
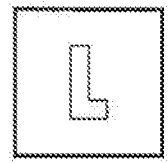
FIG. 10 illustrates a plurality of templates at different rotations.
Figure 10:
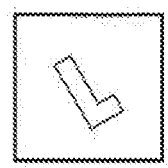
Figure 10:
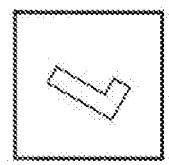
Figure 10:
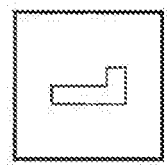
Figure 10:
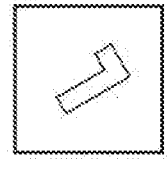
Figure 10:
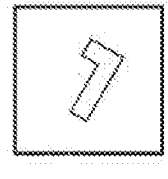

Referring to FIG. 10, to increase the computational efficiency of the system for input images that have objects therein that are at different angular orientations, the model image may be rotated to a plurality of different orientations. The templates are computed at each of the different angular orientations. In this manner, each of the templates for a particular model image may be pre-computed in an efficient manner. For example, the angular positions may include 0 degrees, 30 degrees, 60 degrees, 90 degrees, 120 degrees, and/or 150 degrees. In this manner, an input image to the system to be processed may be compared against a variety of pre-computed lower spatial resolution templates, and in particular, angularly quantized low resolution templates.

Figure 11:
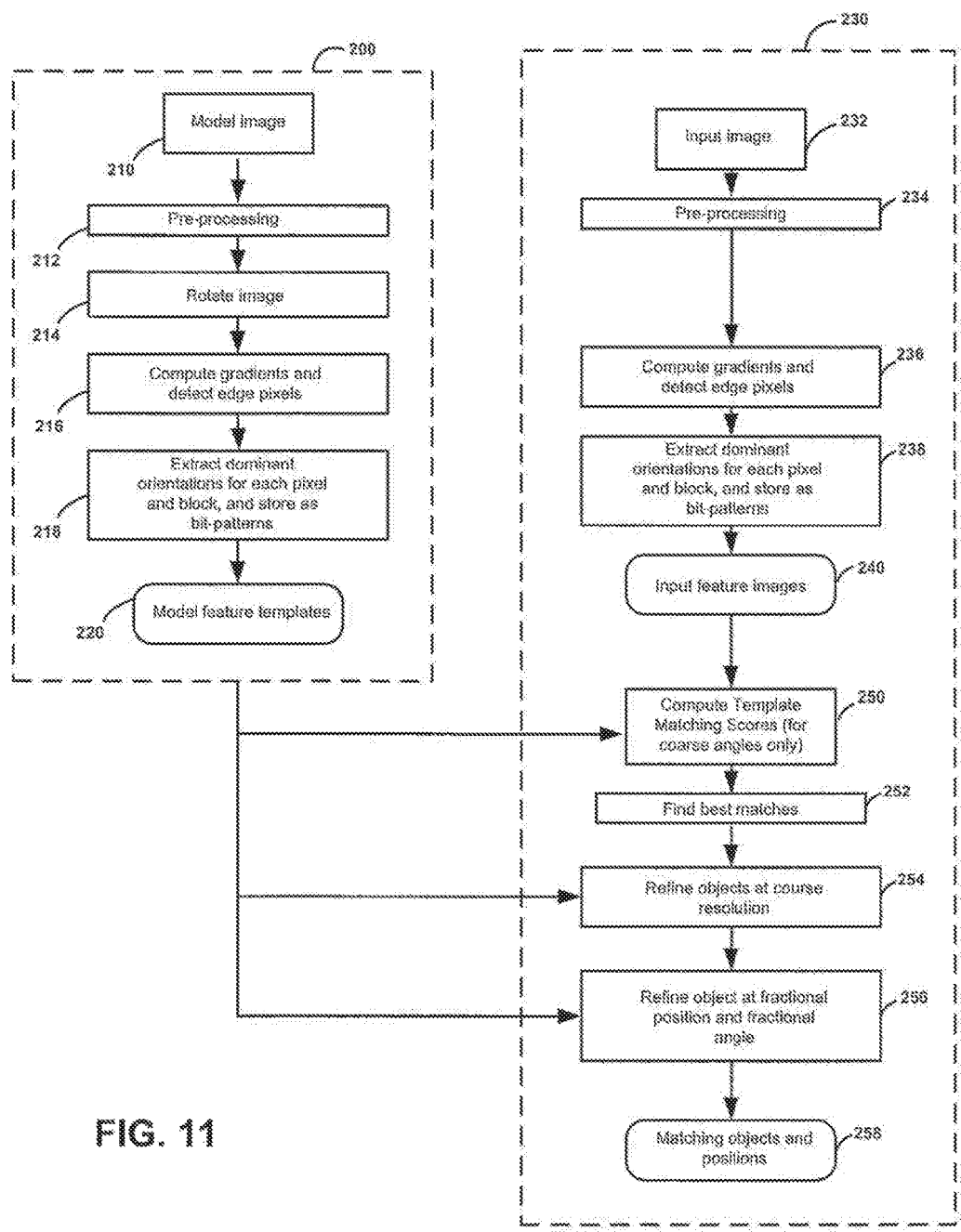
FIG. 11 illustrates an image processing technique for matching.
Figure 12:
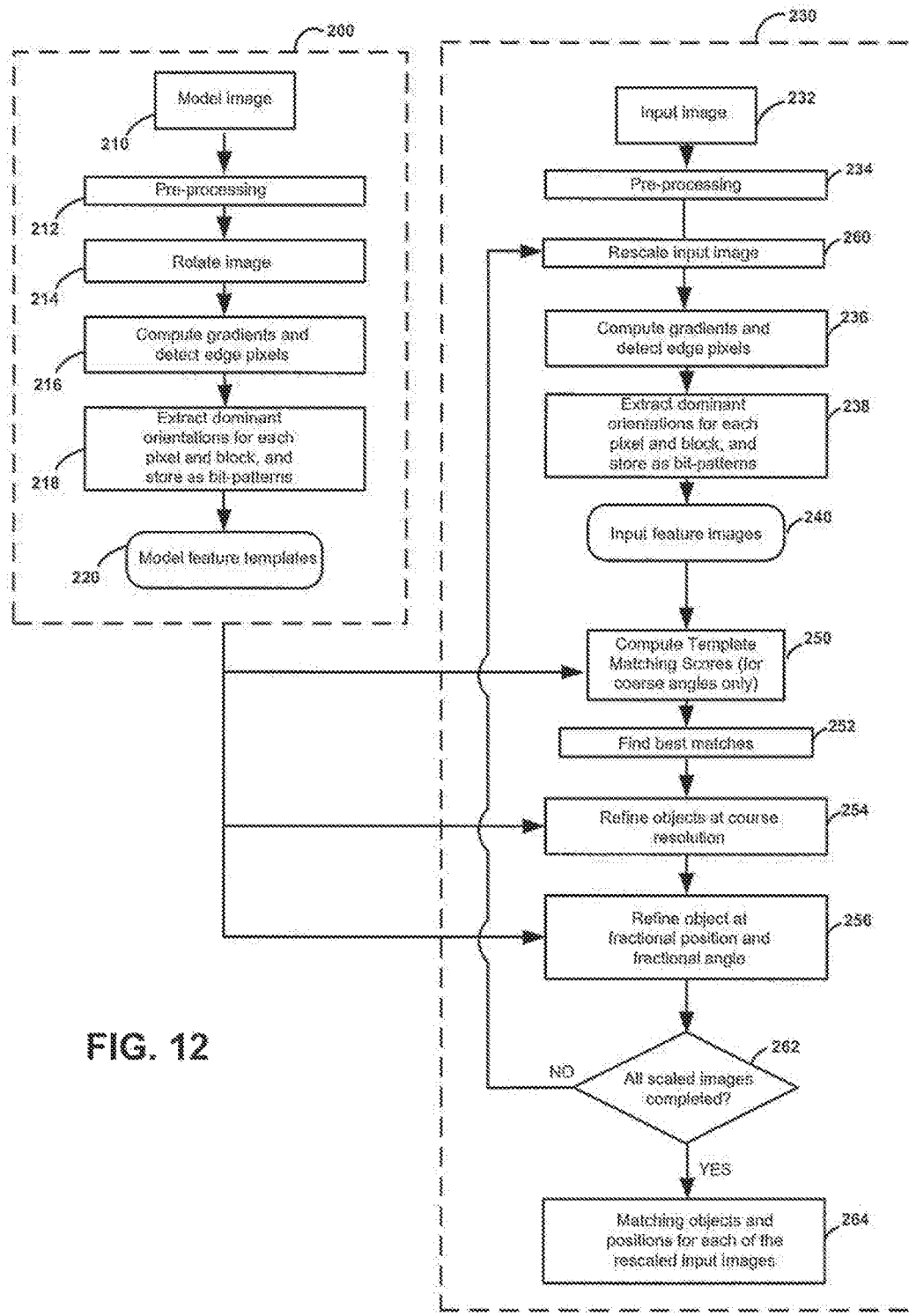
FIG. 12 illustrates an image processing technique for matching that includes scaling.

Referring to FIG. 11, an exemplary model process 200 for a model image 210 and the input image process 230 are shown. The model image 210 may be pre-processed 212 to reduce noise in the image, such as using a low pass filtering operation. The filtered model image 212 may be rotated among a set of orientations, such as by 30 degrees, by a rotation module 214. For each of the set of orientations 214 the system may compute the gradients to identify the edges within the image and determine those pixels of the image corresponding with the edges 216. For each of the set of orientations for which the edges are determined 216, the system may extract the orientations for each pixel and the dominant orientations for blocks of pixels (such as a 4×4 blocks of pixels) and store the result as a set of bytes having suitable bit patterns 218, as previously discussed. In addition, the system may generate a set of full resolution templates at substantially finer angular resolutions, such as rotations of one degree. The result of this process is a set of model feature templates 220.

The exemplary input image process 230 for an input image 232 may include being pre-processed 234 to reduce noise in the image. The system may compute the gradients to identify the edges within the filtered input image and determine those pixels of the image corresponding with the edges 236. For each of the edges that are determined 236, the system may extract 238 the orientations for each pixel and the dominant orientations for blocks of pixels (such as a 4×4 blocks of pixels) and store the result as a set of bytes having suitable bit patterns 240, as previously discussed. The system may likewise compute a full resolution input feature images. The result of this process is input feature images 240.

The system may compute template matching scores 250 between the input feature images 240 and each of the coarse rotations of the model feature templates 220 for different regions of the input image 232. These comparison templates are preferably based upon the byte representation of the respective images, as previously discussed. For example, the system may process the templates centered at each pixel or block of pixels of the input image or otherwise in any other suitable manner. A set of matches 252, preferably those with the highest scores, between the input feature images and the template is determined in any suitable manner.

The result of the matches 252 provides initial candidate locations in the input image that are likely to include an object of interest and also provide rough angular orientations of the objects of interest. The system then refines 254 the angular orientation of each of the objects of interest in the input image by using the course resolution model image at its finer angular resolutions to determine a finer angular estimation. In addition, the system may refine 254 the spatial location of each of the objects of interest in the input image by using the coarse resolution model image at its finer angular resolution. The input feature images may use a higher resolution and/or finer angular resolution, if desired. A set of refined matches between the input feature images and the templates are determined in a suitable manner.

The use of a two-stage matching process is computationally more efficient than a one-stage process. The first stage provides a rough estimation of the location of potential objects of interest in the input image, in an efficient manner. The second stage provides a finer estimation of the location of the identified potential objects of interest in the input image, in an efficient manner, by reducing the area of the search and the angular range of the search.

The result of the matching refinement 254 may be provided to a fractional refinement process 256. The fractional refinement process 256 may include an angular search and/or a spatial search using the "full resolution" model image. Also, the fractional refinement process 256 may refine the angular orientation of the objects of interest in the input image by using the "full resolution" model image at angles interpolated in some manner between its finer angular resolutions to determine a fractional angular estimation. In addition, the fractional refinement process 256 may refine the spatial location of the objects of interest in the input image by using the "full resolution" model image at its finer angular resolution and/or fractional angle at positions interpolated in some manner. The input feature images may use a higher resolution and/or finer angular resolution template, if desired. A set of further refined matches 258 is determined in a suitable manner.

The use of a three-stage matching process is computationally more efficient than a one-stage or two-stage process. The first stage provides a rough estimation of the location of potential objects of interest in the input image, in an efficient manner. The second stage provides a finer estimation of the location of the identified potential objects of interest in the input image, in an efficient manner, by reducing the angular range of the search. The third stage provides a reduced spatial and/or angular search together with a sub-angular and/or sub-pixel resolution which provides a finer estimation of the location of the identified potential objects of interest in the input image, in an efficient manner.

In some cases it may be desirable to provide the ability to more accurately match the model image to the objects in the input image having different scales. The model feature templates are preferably determined at a single scale. The input feature images are preferably determined at a plurality of scales, which is more memory efficient than storing the model image at a plurality of scales. The system may rescale 260 the input image 232 to a different scale. Thereafter, a set of templates and object matching is performed on the rescaled input image 260. The system determines if all scaled images are completed 262, which if not, then the system rescales the input image 260 to a different scale. Generally duplicate matches may be omitted, if desired. When the system determines that all scaled images are completed 262, then the system provides the matching objects and positions for each of the rescaled input images 264 which may be mapped back to the input image resolution.

Figure 13:
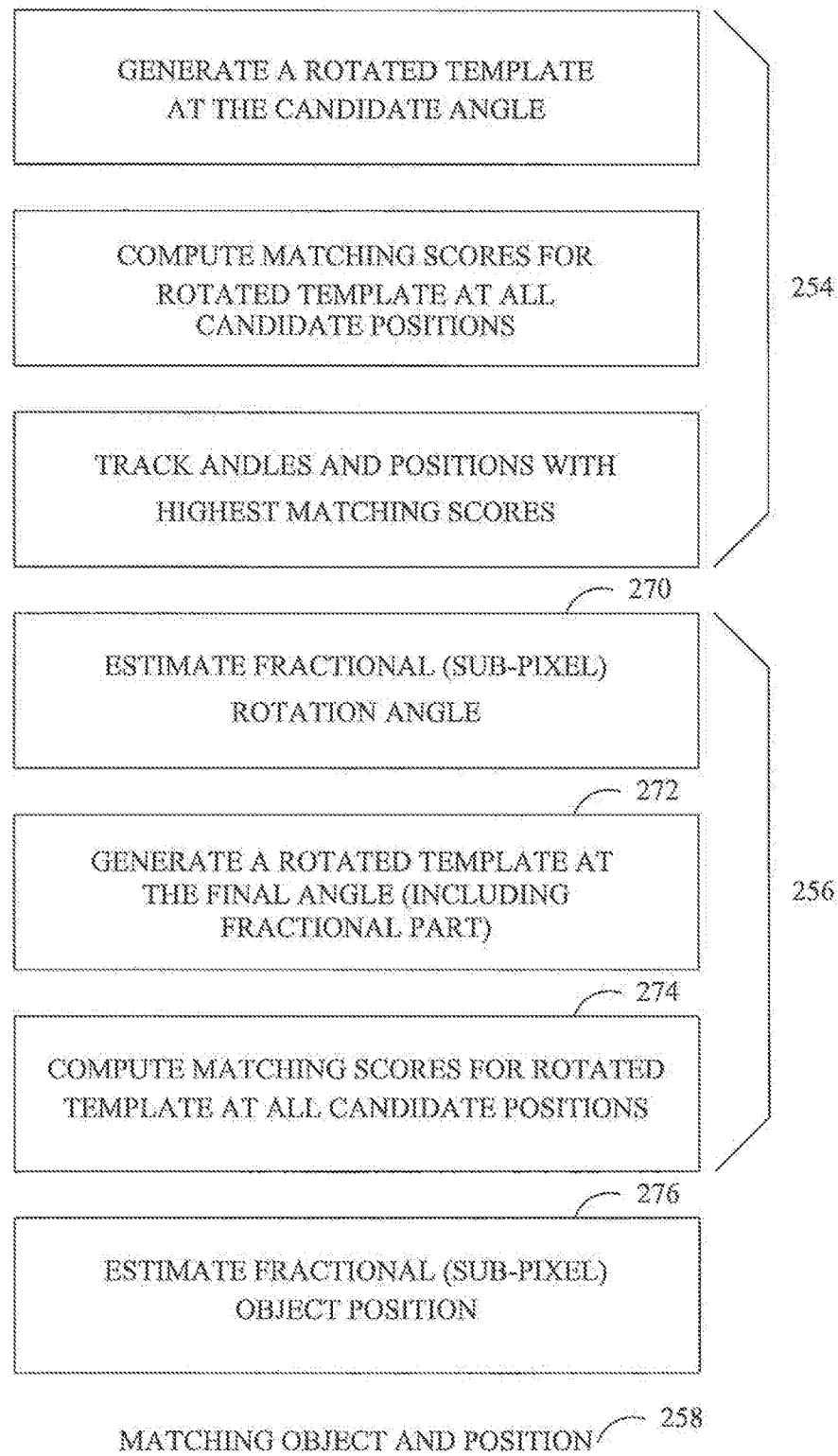
FIG. 13 illustrates a refinement technique for image matching.

Referring to FIG. 13, a more detailed illustration of the refine objects at full resolution process 254 and the refine object at fractional position and fractional angle process 256 are shown. The refine objects at full resolution process 254 may use a set of candidate angles in a local range around the current angle candidate and a set of candidate positions in a local rage around the current position. The angles and positions with the highest matching scores may be tracked. The refine object at fractional position and fractional angle process 256 may estimate a fractional sub-degree rotation angle 270, generate a rotated template at the estimated fractional rotation angle 272, compute matching scores for the rotated template at all candidate positions 274, and estimate fractional sub-pixel object position 276, to provide the object angle and position 258.

Figure 14:
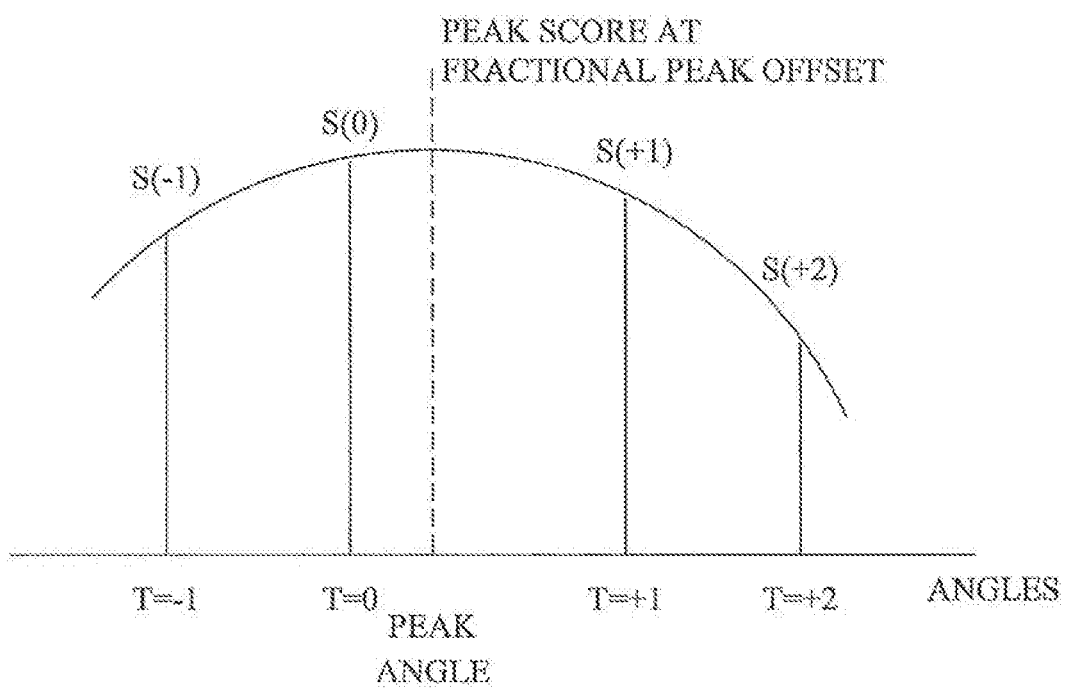
FIG. 14 illustrates a fractional peak offset.

Referring to FIG. 14, one technique for estimating the fractional rotational offset is to assume that the peak score values locally behave as a quadratic function of the rotation angle. The peak scores at a set of discrete angles may be determined (e.g., s(−1), s(0), s(1)). The peak score may be estimated as {s(−1)−s(1)}/2{s(−1)+s(1)−2*s(0)}.

The sub-pixel refinement 256 may be performed in any suitable manner. Often the input to the sub-pixel refinement 256 is a score at each pixel and the location of a peak value. Thus the refinement technique may be based on a local score map around the course peak point.

A Barycentric weighting technique may use the score map values to weight each pixel in the local window to obtain the centroid of the neighborhood around the peak value. The Barycentric weighting technique is computationally efficient although tends to be limited to a linear fitting. This may be represented as:

$$x_c = \frac{\Sigma_i(x_i s_i)}{\Sigma_i x_i}$$

$$y_c = \frac{\Sigma_i(y_i s_i)}{\Sigma_i y_i}$$

A quadratic curve fitting technique fits a bi-quadratic curve to the pixels in the local window around the peak points. This uses a second order fitting which includes a least squares estimation of the error and produces two sets of three coefficients that may be used to reconstruct the curve and find the maximum. This fitting process may be improved by solving the linear equation sets by Hessian matrix and first order derivative. The result is the sub-pixel offset of the maximal point. Without lose of generality, the coarse peak point may be located at (0,0), which is the center of the local window of the score used for refinement. The model for the refinement may be:

$$f(x,y)=ax^2+by^2+cxy+dx+ey+g$$

Where $$\frac{\partial^2 f}{\partial^2 x} = a \quad \frac{\partial f}{\partial x} = 2ax+cy+d$$

$$\frac{\partial^2 f}{\partial^2 y} = b \quad \frac{\partial f}{\partial y} = 2by+cx+e$$

The first order of x and y should be 0 at the peak point, then the equation set as follows as:

$$\begin{bmatrix} 2a & c \\ c & 2b \end{bmatrix} \begin{bmatrix} x \\ y \end{bmatrix} = -\begin{bmatrix} d \\ e \end{bmatrix}$$

The system may use the first and second derivative at the coarse peak point to approximate the coefficients a, b, c, d, and e to get the solution of x and y, which is the sub-pixel shift.

A Gaussian fitting technique may be used, such as using a two dimensional Gaussian plane model. The data in the score map is presumed to have a normal distribution. The system may use the first and second derivative at the coarse peak point to approximate the coefficients a, b, c, d, and e to get the solution of x and y, which is the sub-pixel shift. The Gaussian fitting may be represented as:

$$G(x,y) = \frac{1}{2\pi\sigma_x\sigma_y} g^{-\left(\frac{(x-\mu_x)^2}{2\sigma_x^2}\right)+\left(\frac{(y-\mu_y)^2}{2\sigma_y^2}\right)}$$

The fitting objective is to find the proper $\sigma_x$, $\sigma_y$, $\mu_x$, $\mu_y$ to estimate the non-grid value. The $\mu_x$, $\mu_y$ are the results for Gaussian sub-pixel refinement. The fit procedure may use the Levenberg-Marquardt optimization technique for the local window.

The feature matching techniques of the system may be improved by identifying particular regions of the image that should be searched and/or otherwise particular regions of the image that should not be searched. The coarse searching requires a significant amount of computational time and a more computationally efficient initial matching criteria may be used to decrease the processing time of the subsequent coarse matching technique.

Figure 15:
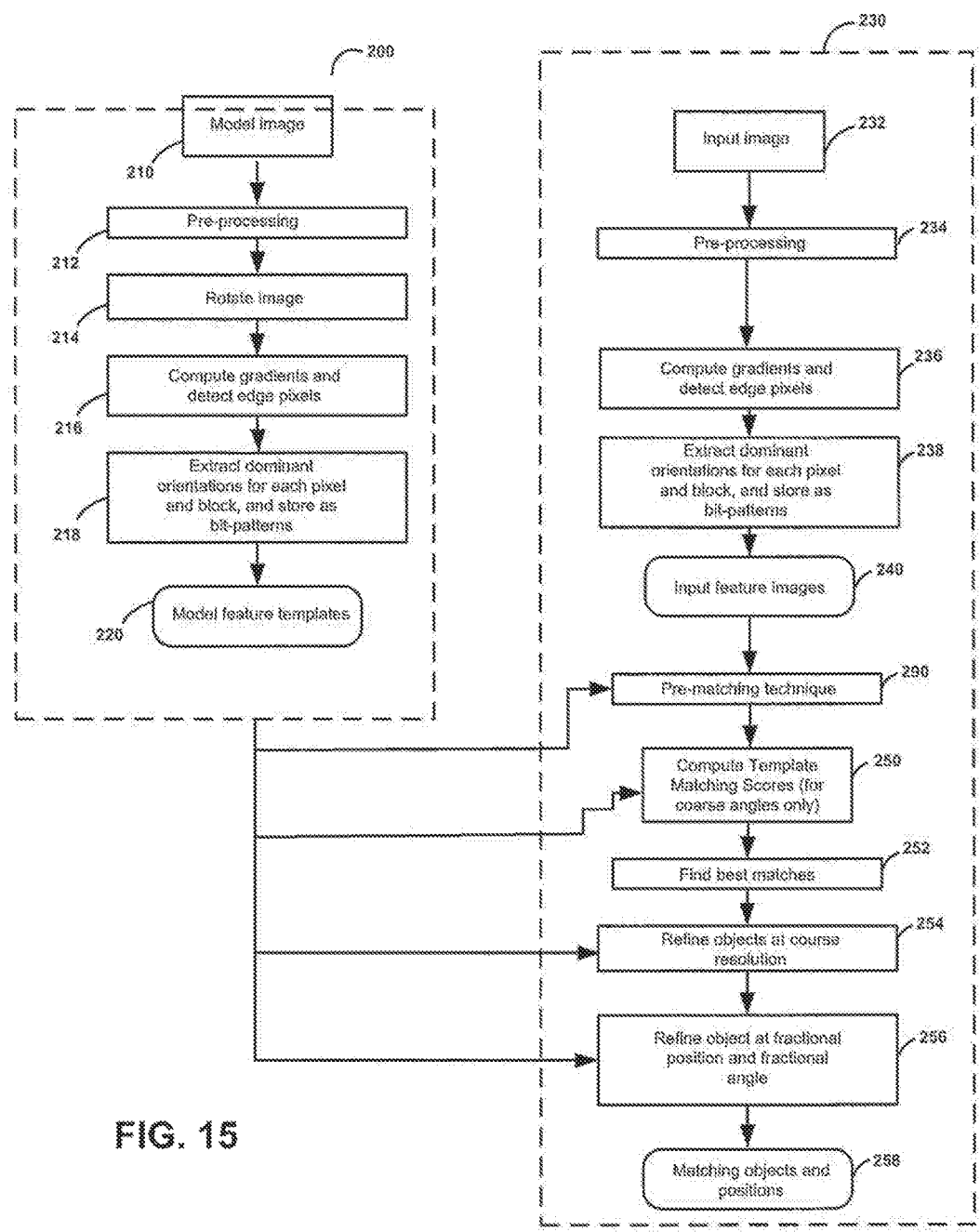
FIG. 15 illustrates an image processing technique for matching that includes pre-filtering.

Referring to FIG. 15, a pre-matching technique 290 may use those pixels identified as edge pixels to do an initial screening of areas of the input image. Pixels not identified as being part of an edge may be omitted as not being likely to be an object in the input image. Thus, the system primarily only performs a matching on the non-zero edge pixels. Thus, the matching technique may indicate candidate positions that are very unlikely to result in a good match, and thus may be skipped. Accordingly, positions that are likely to result in at least a reasonable match are considered in the coarse search stage. The pre-matching technique 290 may determine if the number of edge pixels in the model template is relatively close to the number of edge pixels within the potential object area in the input image. Due to the likelihood of some occlusions or partial objects, the input edge pixel count may at times tend to be smaller than the model edge pixel count. Accordingly, one suitable criteria could for the pre-matching technique 290 is as follows: input edge pixel count >=model edge pixel count*ratio. As it may be appreciated, the edge pixel count is a feature that is computationally efficient to determine and tends to be rotationally invariant. The result is a mask image that defines those regions that meet the pre-matching technique 290 criteria, thus reducing those regions of the image that should be matched during subsequent more computationally intensive processing.

In some cases, it may be more computationally efficient to perform the matching techniques at multiple down sampled resolutions. For example, the matching may be performed at image resolutions down sampled initially at a 4×4 block resolution. A threshold may be applied to the result to further reduce the regions to be searched. Then those areas of potential matching the matching may be performed at image resolutions down sampled at 2×2 block resolutions. Also, a threshold may be applied to the result to further reduce the regions to be searched. In this manner, the coarse template matching may be performed in a computationally efficient manner. Downsampling the feature image may be performed very efficiently using bitwise operations. For example, the bitwise OR operation may be used to combine bit patterns corresponding to feature values of pixels in a 2×2 area.

In some cases, it is desirable to use a modified set of angular orientations for the search, rather than, 0 degrees, 30 degrees, 60 degrees, 90 degrees, 120 degrees, and/or 150 degrees. The selected spacing between the different orientations is preferably sufficiently small enough that the search technique does not miss a match, but likewise sufficiently large enough to make the matching technique computationally efficient. This determination may be based upon an auto-correlation between the original template and the rotated templates. The coarse angle search step may be selected based on the width of the main peak in the auto-correlation function. Computing and analyzing the rotational auto-correlation of the templates may be performed during an off-line stage. This enables adaptation of the angle search step to the specific object, such that the processing time is reduced for various objects.

Figure 16:
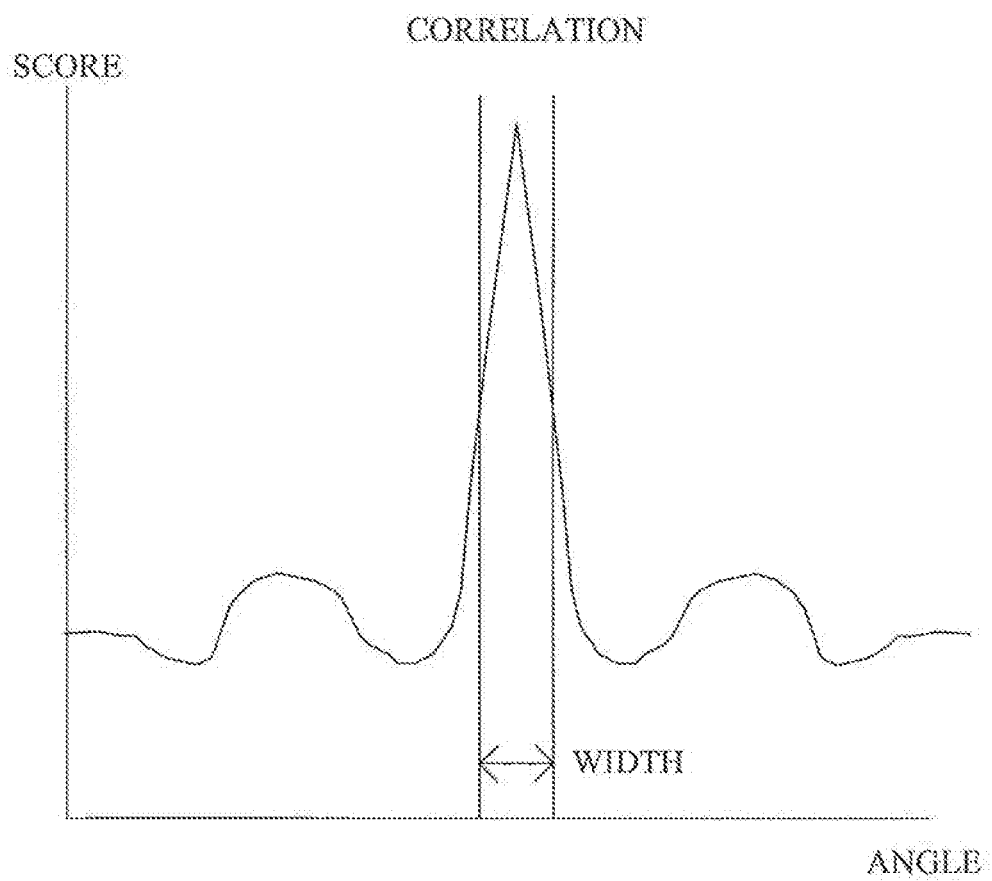
FIG. 16 illustrates a correction of different angles together with a threshold.

Referring to FIG. 16, an exemplary correlation graph is shown as a function of angular degree. It may be observed by selecting a sufficiently small range ensures that the peak will be determined. In contrast, if a sufficiently large range is selected then one or more of the minor peaks may be inadvertently selected.

In many cases, model images have sufficient symmetry that the system should employ a technique that only searches a range of approximately 180 degrees. The model image may be analyzed to determine if it is sufficiently symmetrical in some manner to be suitable for using a symmetrical technique. In the event the model image is not symmetrical, then a technique using generally a full 360 degree search range may be used. The analysis of symmetry of the object in the model image may be based on the auto-correlation of the model template. This analysis may be performed in an off-line stage. Searching a range of approximately 180 degrees during the coarse template matching stage reduces processing time, compared to searching a full range of 360 degrees. In some cases, the analysis may indicate that an object has more symmetry, such as 3 or 4 fold symmetry. In such cases, the search range may be reduced further below 180 degrees.

In some cases it is desirable to do a coarse matching technique followed by a refined matching technique. Then it is desirable to perform another refined matching technique in the opposite direction, such as at 180 degrees from the results of the first matching technique. Thereafter, the orientation with the better matching may be used for the sub-pixel sub-angular further matching refinement. For example, in the case that a reduced angular search is performed in a range of approximately 180 degrees instead of 360 degrees, it is desirable to perform an additional refinement stage in a small angle range around the angle 180 degrees opposite of the first refinement result.

While the compute template matching scores 250 performs an adequate matching function, it requires significant computational resources because of the large number of locations that need calculations to be performed with respect to the model feature templates 220. In particular, the brute-force sliding window based technique of the aforementioned compute template matching scores 250 process requires significant computational resources. Moreover, regions of the input image which are not particularly relevant to the particular characteristics of the model image 210 are likewise processed for potential matches using the brute force technique, which is similarly computationally expensive. A more computationally effective technique that is suitable for the general template matching architecture is desirable that still maintains a discriminative feature set. A suitable approach to maintaining a discriminative feature set, while reducing the computational complexity, is to use a feature location index.

Figure 17:
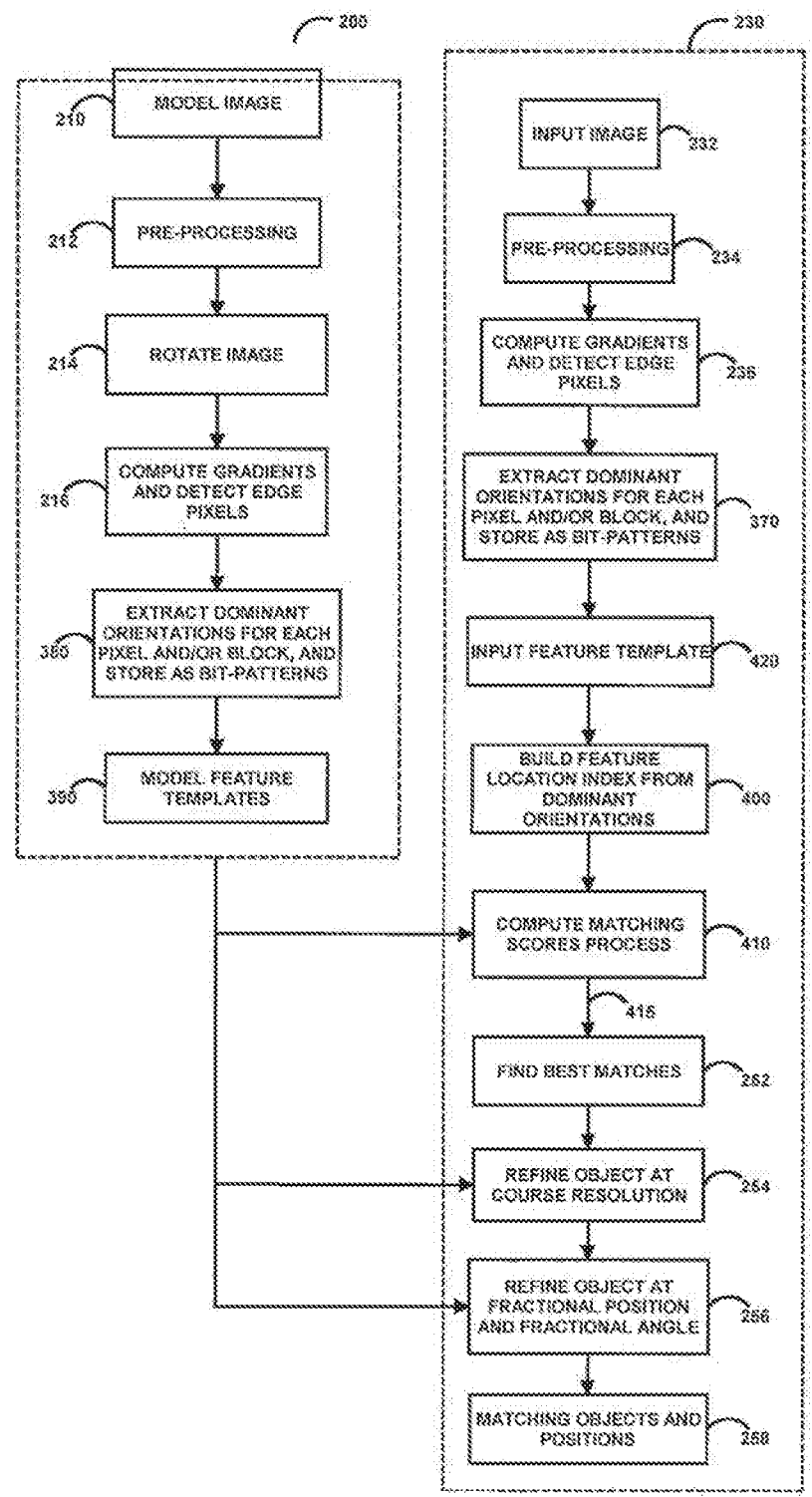
FIG. 17 illustrates a modified image processing technique for matching.

Referring to FIG. 17, a modified system (1) for the input image process 230 receiving the input image 232 and (2) the model image process 200 receiving the model image 210 is illustrated. The model image process 200 includes an extraction of dominant orientations for each pixel and/or block 380 which may result in a modified model feature template 390, if desired.

Figure 18:
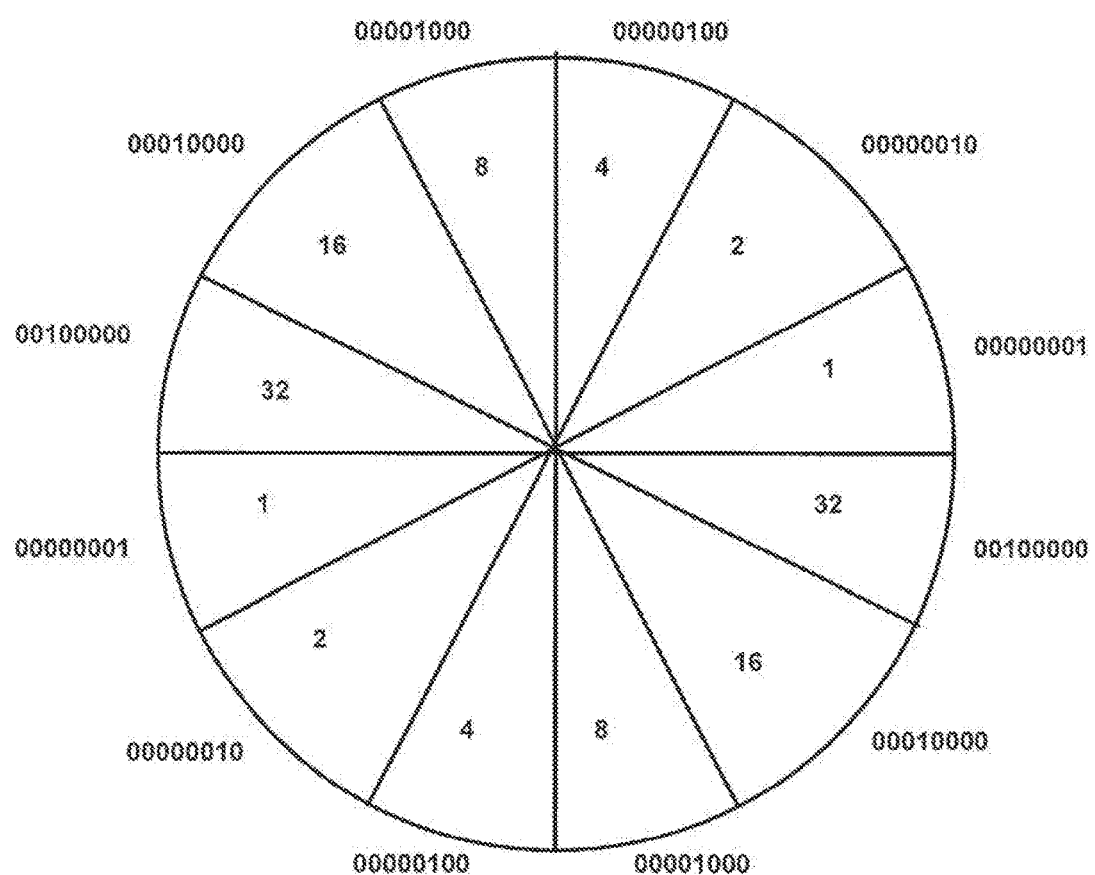
FIG. 18 illustrates a set of angular orientations for image features.

Referring also to FIG. 18, to increase the computational efficiency, the extract dominant orientations 380 may be encoded using a set of bytes, with bits of each byte being representative of an angular orientation for a pixel and/or a block of pixels. For example, the first bit may be representative of a first angular orientation of six orientations. For example, the second bit may be representative of a second angular orientation of six orientations. For example, the third bit may be representative of a third angular orientation of six orientations. For example, the fourth bit may be representative of a fourth angular orientation of six orientations. For example, the fifth bit may be representative of a fifth angular orientation of six orientations. For example, the sixth bit may be representative of a sixth angular orientation of six orientations. The angular orientations may be aligned with the horizontal axis and vertical axis, such as +90 degrees to +60 degrees (e.g., 00000001), +60 degrees to +30 degrees (e.g., 00000010), +30 degrees to +0 degrees (e.g., 00000100), +0 degrees to −30 degrees (e.g., 00001000), −30 degrees to −60 degrees (e.g., 00010000), and −60 degrees to −90 degrees (e.g., 00100000). By ignoring the direction of the angular orientation, the remaining orientations may be as follows, such as, −90 degrees to −120 degrees (e.g., 00000001), −120 degrees to −150 degrees (e.g., 00000010), −150 degrees to −180 degrees (e.g., 00000100), +180 degrees to +150 degrees (e.g., 00001000), +150 degrees to +120 degrees (e.g., 00010000), and +120 degrees to +90 degrees (e.g., 00100000). In the case that there is no dominant orientation the system may assign 00000000 to that feature code value. In this manner, the sufficiently flat background areas of the image and/or those without with no dominant orientation will have 00000000 values as the feature code value. The division of the 360 degree range into the angular orientations may be rotated, as a whole, any desired amount. For example a suitable rotation may be 15 degrees from that shown in FIG. 18. The bytes associated with particular angular orientations may be changed, as desired.

Figure 19:
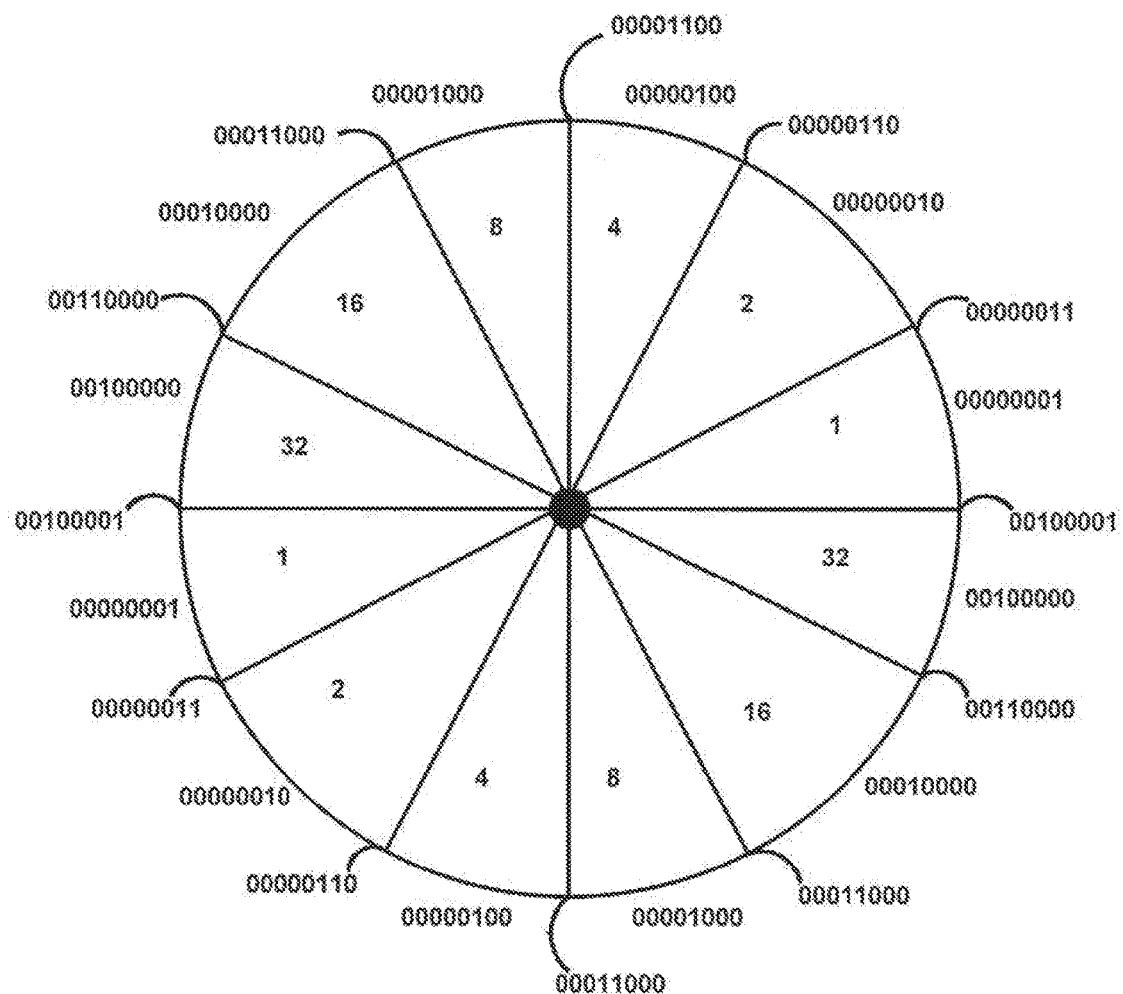
FIG. 19 illustrates another set of angular orientations for image features.

Referring also to FIG. 19, to increase the ability to discriminate among finer orientations while not substantially increasing the coding complexity, the extract dominant orientations 380 may be encoded using a set of bytes, with multiple bits of each byte being representative of an angular orientation for a pixel and/or a block of pixels. In particular, a pair of bits may be used to signal a different angular orientation than each bit alone. For example, the first bit may be representative of a first angular orientation of six orientations. For example, the second bit may be representative of a second angular orientation of six orientations. For example, the third bit may be representative of a third angular orientation of six orientations. For example, the fourth bit may be representative of a fourth angular orientation of six orientations. For example, the fifth bit may be representative of a fifth angular orientation of six orientations. For example, the sixth bit may be representative of a sixth angular orientation of six orientations. The angular orientations may be aligned with the horizontal axis and vertical axis, such as +90 degrees to +60 degrees (e.g., 00000001), +60 degrees to +30 degrees (e.g., 00000010), +30 degrees to +0 degrees (e.g., 00000100), +0 degrees to −30 degrees (e.g., 00001000), −30 degrees to −60 degrees (e.g., 00010000), and −60 degrees to −90 degrees (e.g., 00100000). By ignoring the direction of the angular orientation, the remaining orientations may be as follows, such as, −90 degrees to −120 degrees (e.g., 00000001), −120 degrees to −150 degrees (e.g., 00000010), −150 degrees to −180 degrees (e.g., 00000100), +180 degrees to +150 degrees (e.g., 00001000), +150 degrees to +120 degrees (e.g., 00010000), and +120 degrees to +90 degrees (e.g., 00100000). In the case that there is no dominant orientation, the system may assign 0000000 to that feature code value. The feature code values are, accordingly, 1, 2, 4, 8, 16, and 32.

The angular orientations may further be refined by pairs of bits, such as, such as +75 degrees to +45 degrees (e.g., 00000011), +45 degrees to +15 degrees (e.g., 00000110), +15 degrees to −15 degrees (e.g., 00001100), −15 degrees to −45 degrees (e.g., 00011000), −45 degrees to −75 degrees (e.g., 00110000), and −75 degrees to −105 degrees (e.g., 00100001). By ignoring the direction of the angular orientation, the remaining orientations may be as follows, such as, −105 degrees to −135 degrees (e.g., 00000011), −135 degrees to −165 degrees (e.g., 00000110), −165 degrees to +165 degrees (e.g., 00001100), +165 degrees to +135 degrees (e.g., 00011000), +135 degrees to +105 degrees (e.g., 00110000), and +150 degrees to +75 degrees (e.g., 00100001). The feature code values are, accordingly, 3, 6, 12, 24, 48, and 33, in addition to 1, 2, 4, 8, 16, and 32. The additional feature codes facilitate an increase in precision while maintaining a robust system. This multi-bit signaling technique provides the capability of more robustly signaling regions near the boundary between regions signaled by the single bit, without significant added complexity. The division of the 360 degree range into the angular orientations may be rotated, as a whole, any desired amount. For example a suitable rotation may be 15 degrees from that shown in FIG. 19. The bytes associated with particular angular orientations may be changed, as desired.

Referring again to FIG. 17, the dominant gradient orientations 380 may be stored as model feature templates 390. The input image process 230 may receive the dominant gradient orientations 370 and/or the input feature templates 420 to construct a feature location index from dominant orientations 400. Accordingly, each pixel location and/or block of pixels may have a corresponding feature code that is encoded in some manner. It is noted that other image features may be used, in addition to or in alternative to, the gradient orientation.

Figure 20:
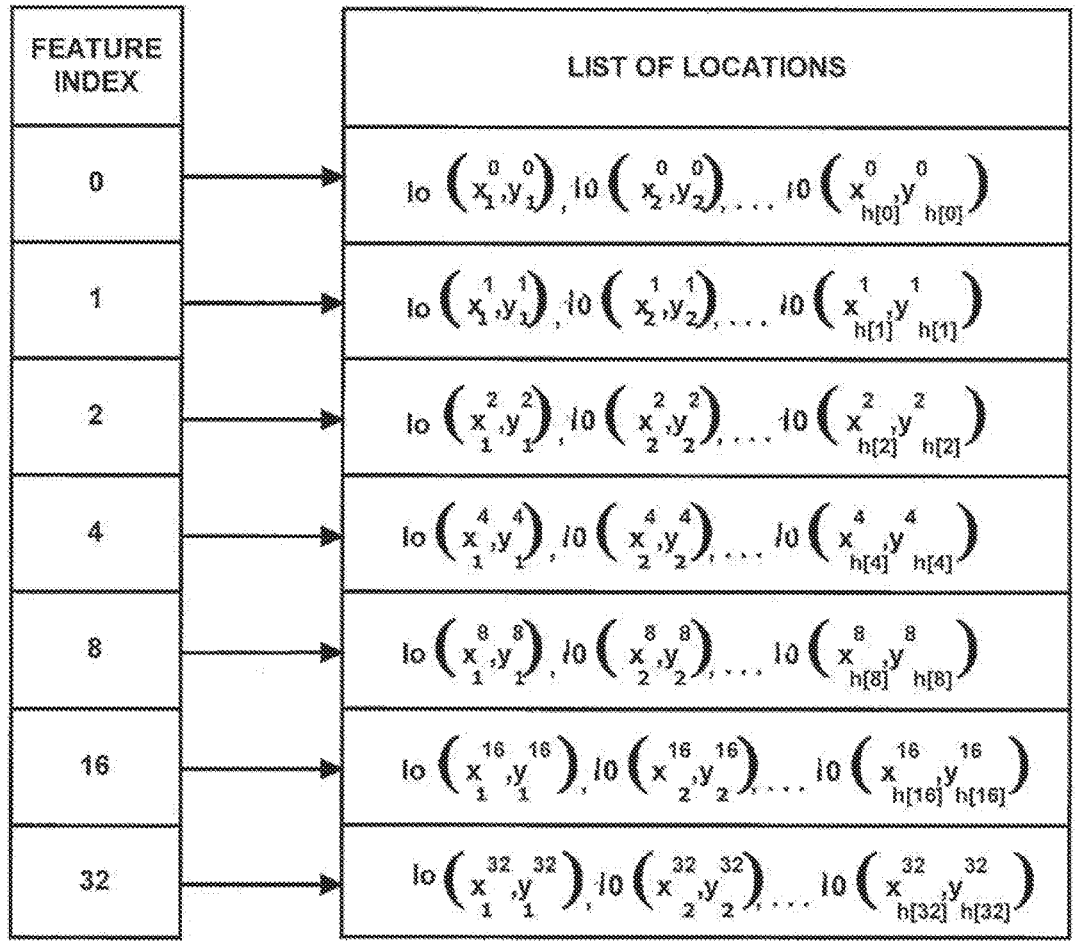
FIG. 20 illustrates a feature location index.

Referring to FIG. 20, the feature location index 400 of the input image 232 may be a feature location list (h[0], . . . , h[32]) which stores a list of locations which belong to each feature. In this manner, the feature location index 400 includes a set of positions for each of the features, namely, 0, 1, 2, 4, 8, 16, and 32. Feature 0 may be omitted, if desired. For each of the features, a list of locations within the input image 232 that correspond with that feature are determined, such as by using the extracted orientations 370 and/or input feature template 420. Accordingly, for each of the features of the index a corresponding list of locations within the input image that have that feature are collected. To further reduce the computational complexity and reduce the memory requirements, each of the spatial (x,y) locations within the list of locations may be stored as a single value, such as (x*image_height+y) or (x+y*image_width).

Referring again to FIG. 17, the input image process 230 includes the extract dominant orientations for each pixel and/or block process 370 which may be stored as an input feature template 420. The extract dominant orientations process 380 may use a corresponding technique to the extract dominant orientations process 370 used to build the feature location index 400. In this manner, the feature characteristics of the model image 210 and the input image 232 may be expressed in a corresponding manner.

Figure 21:
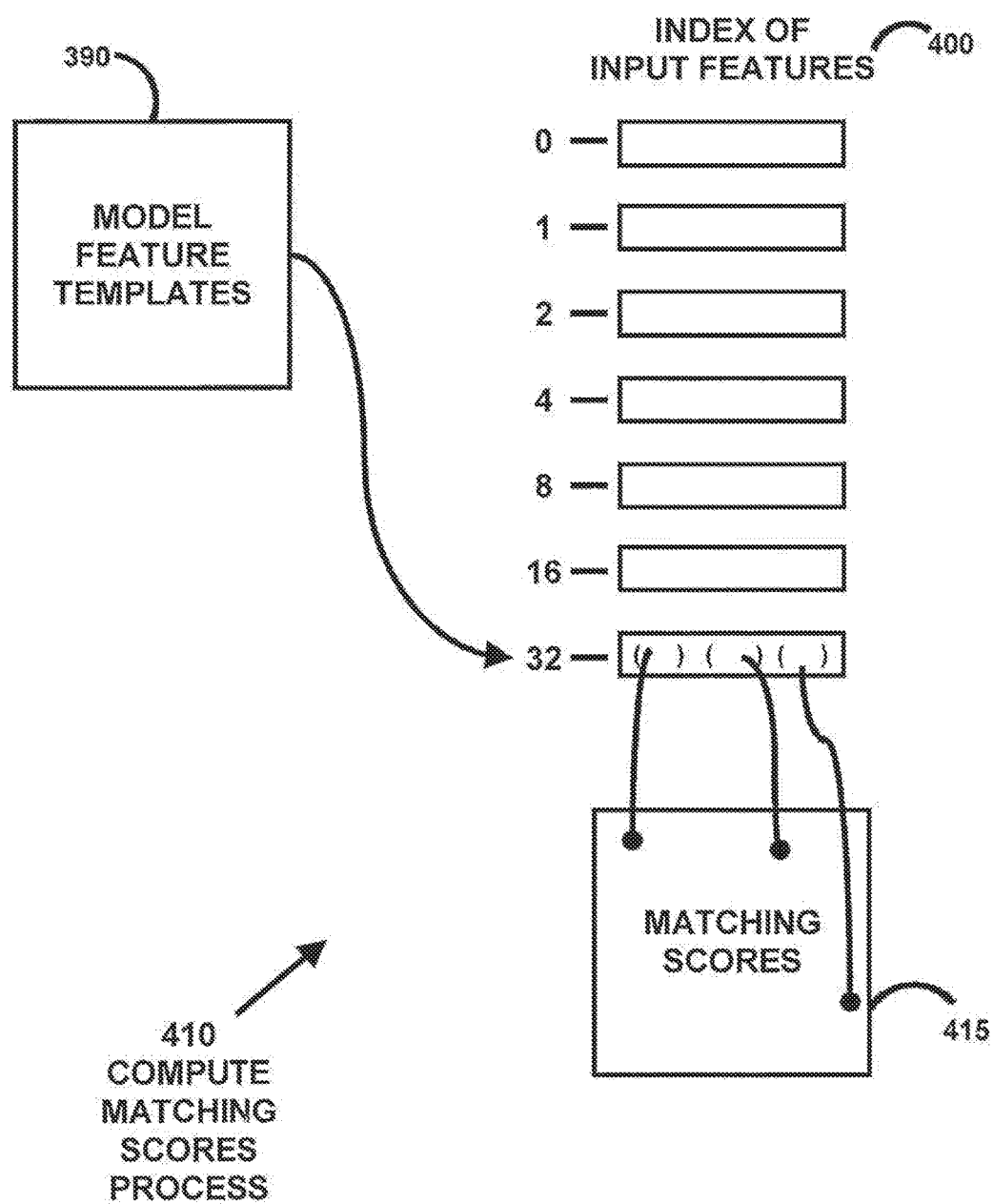
FIG. 21 illustrates the computation of matching scores.

Referring to FIG. 21, each feature value in the model feature template 390 may be matched by a compute matching scores process 410 with the feature location index 400. The locations defined by the feature location index 400 are then accumulated by the compute matching scores process 410. This process is repeated for each pixel and/or block of pixels of the model image 210. The output of the compute matching scores process 410 is a set of matching scores 415.

Figure 22:
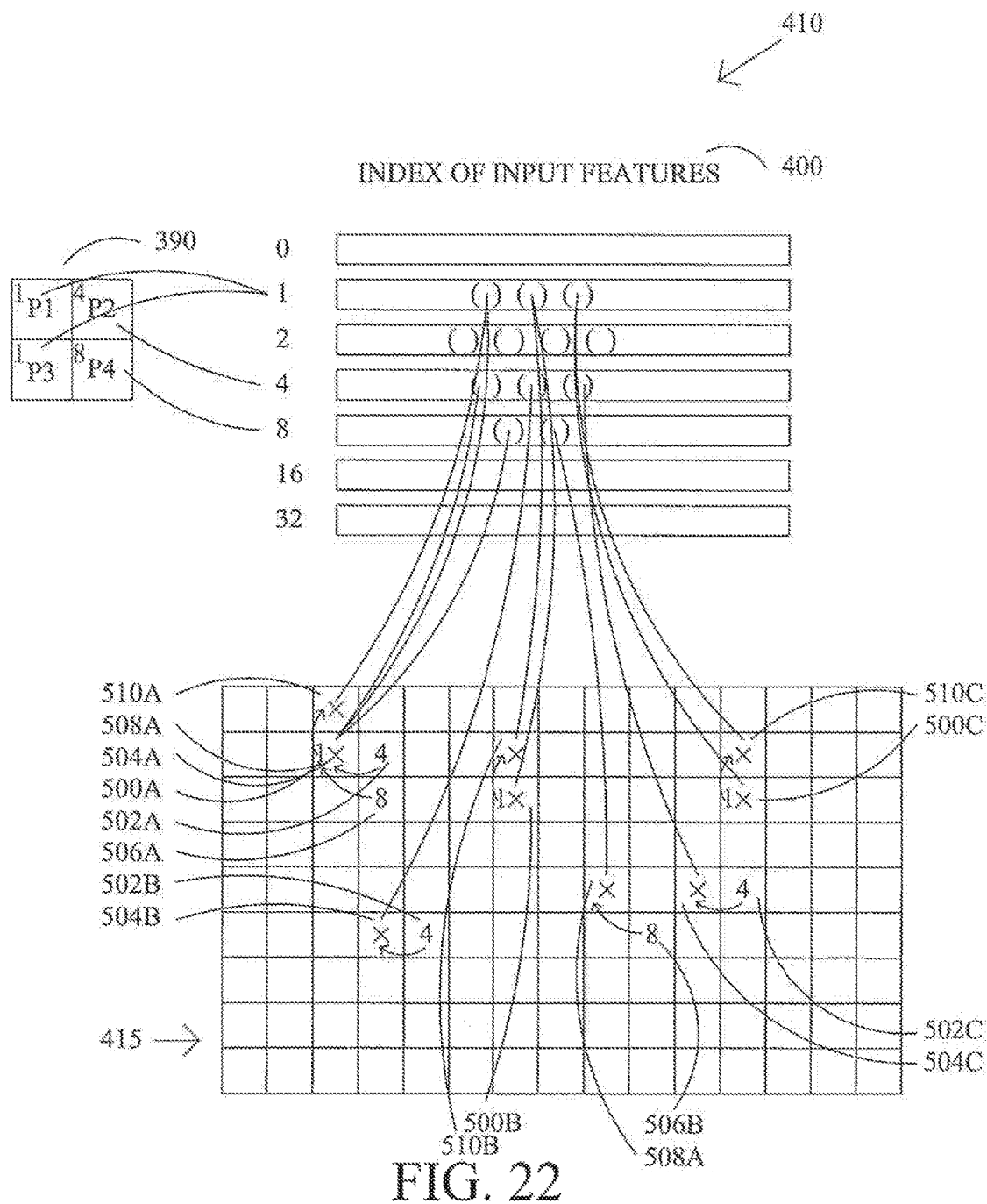
FIG. 22 illustrates a more detailed computation of matching scores.

Referring to FIG. 22, the spatial characteristics of the model feature template may be taken into account. For example, the model feature template may include four positions P1, P2, P3, P4 with the spatial characteristics of a 2×2 array. The position P1 may include feature index 1, the position P2 may include feature index 4, the position P3 may include feature index 1, and the position P4 may include feature index 8. There are three corresponding locations in the input image with feature index 1 for position "P1" as identified by 500A, 500B, 500C. There are three corresponding locations in the input image with feature index 4 as identified by 502A, 502B, 5020 which are accumulated in the matching scores process 410 by shifting one position to the left 504A, 504B, 504C, to account for the spatial characteristics of position "P2" of the model feature template 390. There are two corresponding locations in the input image with feature index 8 as identified by 506A, 506B which are accumulated in the matching scores process 410 by shifting diagonally one position to the upper left 508A, 508B, to account for the spatial characteristics of position "P4" of the model feature template 390. There are three corresponding locations in the input image with feature index 1 as identified by 500A, 500B, 5000, which are accumulated in the matching scores process 410 by shifting one position up to 510A, 510B, 510C, to account for the spatial characteristics of position "P3" of the model feature template 390.

Referring to FIG. 23, the compute matching scores process 410 may accumulate the number of matches for the model feature template 390 at each of the pixels and/or blocks of the input image 232. In this manner, the score map 415 with the accumulated totals is obtained, indicating the position of the likely matches within the input image. It is to be understood that any suitable position within the templates may be used as a reference for the spatial offset. It is also noted that the positions with a feature of 0 may be omitted. It is also noted that this feature template index technique may result in the same matching scores as the brute force sliding window based technique.

In the case that the input feature image generates a uniform distribution of locations for each feature index, the system may achieve generally six times the computational efficiency. Typically, the distribution of locations for each feature index varies, so it is more likely that the system may achieve generally three times the computational efficiency. Furthermore, a significant amount of computational complexity is reduced by omitting locations where the index is 0, and at the same time, the system does not need any coarse-to-fine searches.

It is also to be understood that in some embodiments at least one of the angular orientations for the edge pixels of the input image and/or input feature template may map to a plurality of the feature indexes. It is also to be understood that in some embodiments at least one of the angular orientations for the edge pixels of the model image and/or model feature template may map to a plurality of angular orientations for the matching. It is also to be understood that in some embodiments at least one of the angular orientations for the edge pixels of the input image and/or input feature template may map to a plurality of the feature indexes and at least one of the angular orientations for the edge pixels of the model image and/or model feature template may map to a plurality of angular orientations for the matching.

The system may use a plurality of model templates, each of which likely corresponds with a separate angular orientation and/or view of the model image. In this manner, a set of matching scores may be determined for each of the model images, and thus for each of the angular orientations. An iterative process of feature extraction and matching over a plurality of templates may be used to generate an updated angle map and/or score map. This enables the system to select a template, or interpolate between templates, to more accurately match the objects in the input image. However, in either case, the feature location index is constructed a single time from the input image, which decreases the computational complexity of the system. This plurality of templates may correspond to multiple views of the same object or may correspond to views of multiple, different, objects.

Figure 24:
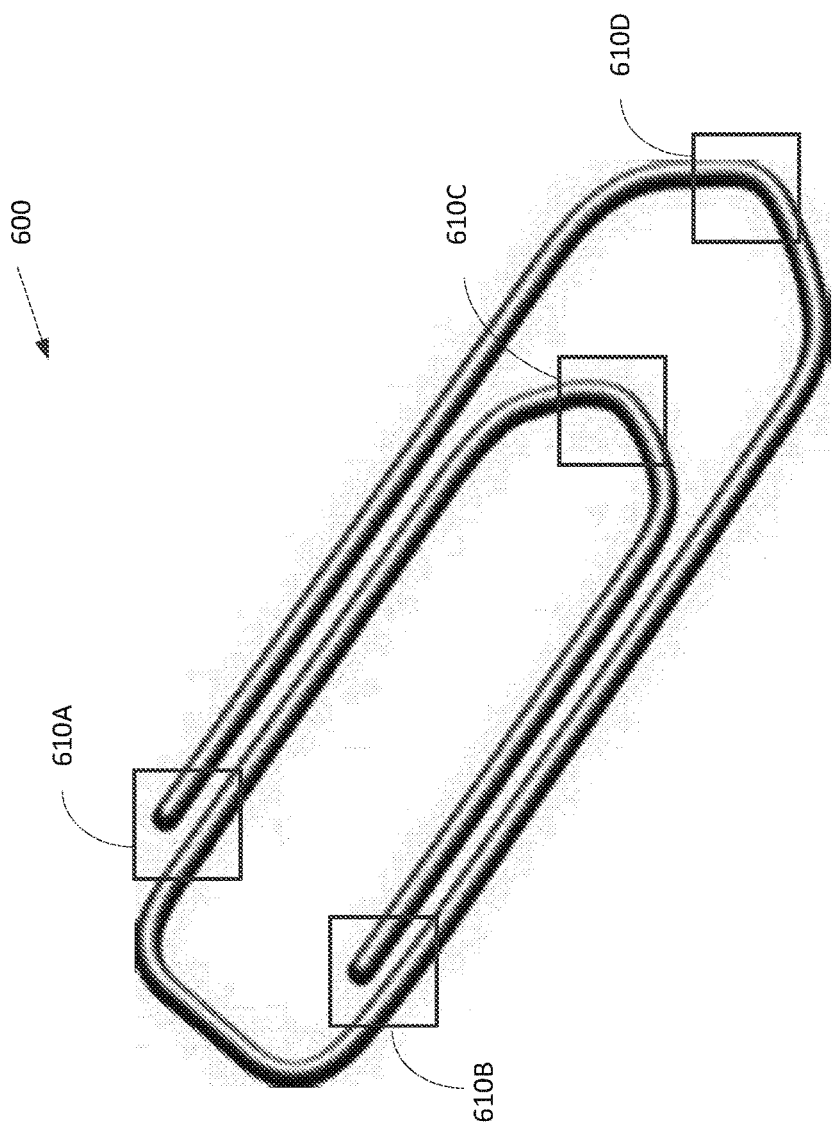
FIG. 24 illustrates an exemplary model image with spatial regions defined thereon.

Referring to FIG. 24, another embodiment includes the model template 600 being subdivided into a plurality of spatial regions, such as regions 610A, 610B, 610C, and 610D. Fewer or additional spatial regions may be used as desired. Preferably each of the spatial regions are non-overlapping but may be overlapping, if desired. Each of the spatial regions is preferably selected such that the spatial regions that are more discriminative of aspects of the model template 600 are selected. Preferably, each of the spatial regions 610A-610D are ranked in some manner from those being more discriminative to those being lesser discriminative of the model image. For example 610A may be the most discriminative, followed by 610B being next discriminative, followed by 610C being next discriminative, followed by 610D being next discriminative, and so on.

Figure 25:
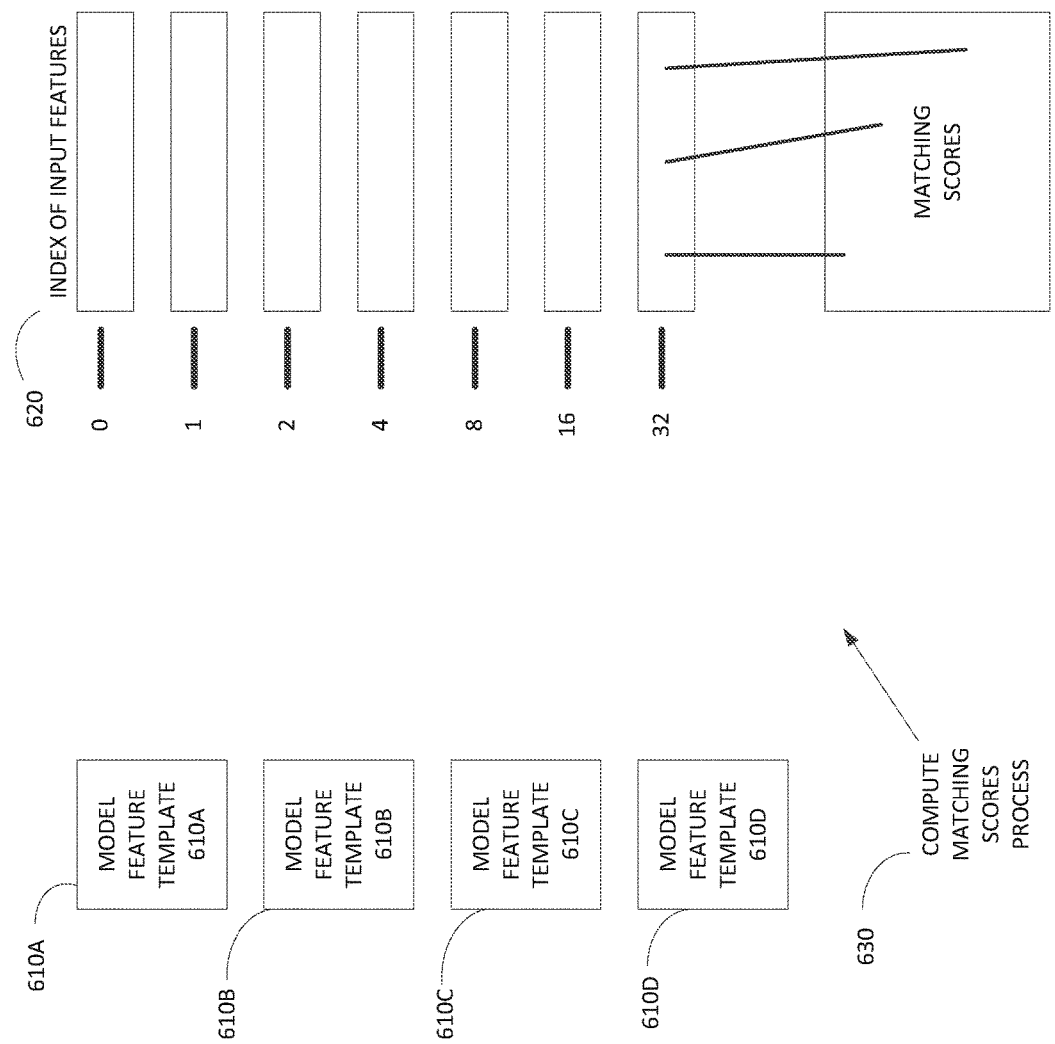
FIG. 25 illustrates another exemplary matching technique.

Matching the entire model template 600 with the feature index thereby forming a list of locations for the entire image tends to take a significant amount of computational resources. Referring to FIG. 25, a more computationally efficient techniques involves selecting the first spatial region 610A that is the most discriminative where each feature value in the spatial region 610A may be matched by a compute matching scores process 630 with the feature location index 620. The locations defined by the feature location index 620 may be accumulated by the compute matching scores process 630. If the compute matching scores process 630 indicates that there is likely a match, then the system may omit matching the remainder of the spatial regions 610B-610D.

If the system doesn't indicate there is a match as a result of spatial region 610A, then each feature value in the spatial region 610B may be matched by the compute matching scores process 630 with the feature location index 620. The locations defined by the feature location index 620 may be accumulated by the compute matching scores process 630. If the compute matching scores process 630 indicates that there is likely a match, then the system may omit matching the remainder of the spatial regions 610C-610D.

This process of incrementally matching the spatial regions one or more at a time, preferably in a decreasingly discriminative manner, and checking if the compute matching scores process 630 indicates that there is likely a match permits the system to omit matching some of the spatial regions if a sufficiently strong match is indicated with only a limited number of matching processes. Similarly, the process of incrementally matching the spatial regions one or more at a time, preferably in a decreasingly discriminative manner, and checking if the compute matching scores process 630 indicates that there is not likely a match permits the system to omit matching some of the spatial regions if an insufficiently strong match is indicated within only a limited number of matching processes. Further, in a step-by-step manner the system can determine if the matching is sufficiently indeterminate, and thus make a decision to match one or more spatial regions.

Figure 26:
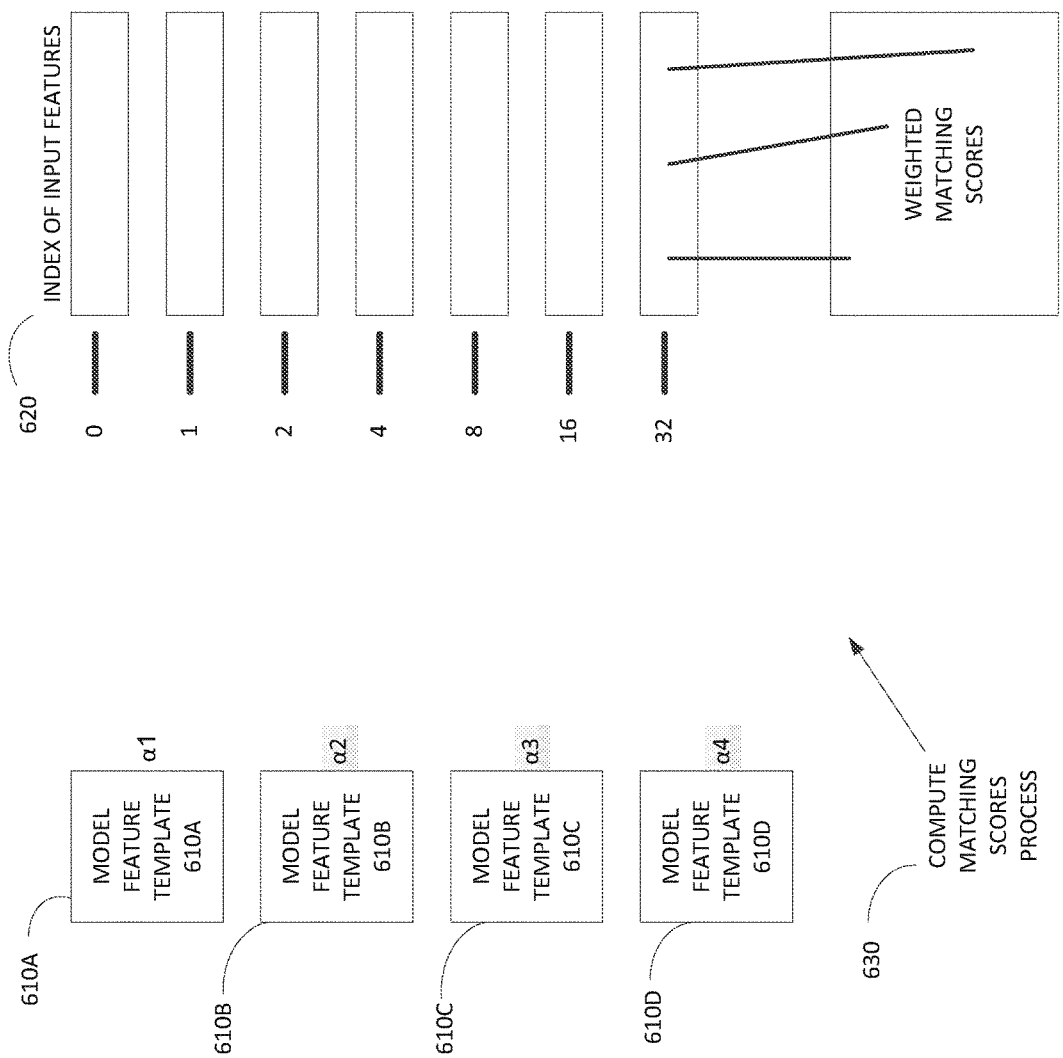
FIG. 26 illustrates another exemplary matching technique.

Referring to FIG. 26, another technique may involve each of the spatial regions 610A-610D being associated with a corresponding weighting. For example, spatial region 610A may be associated with a first weight $\alpha 1$, spatial region 610B may be associated with a second weight $\alpha 1$, spatial region 610C may be associated with a third weight $\alpha 3$, spatial region 610D may be associated with a fourth weight $\alpha 4$, and so forth. The spatial regions with the more discriminative features should have a greater weight $\alpha$ than those with less discriminative features. Each of the spatial features may be matched by the compute matching scores process 630 with the feature location index 620 and weighted by the weight $\alpha$. The locations defined by the feature location index 620 may be accumulated by the compute matching scores process 630. In this manner, the system may provide a greater emphasis on those regions of the model template that tend to be more discriminative.

Figure 27:
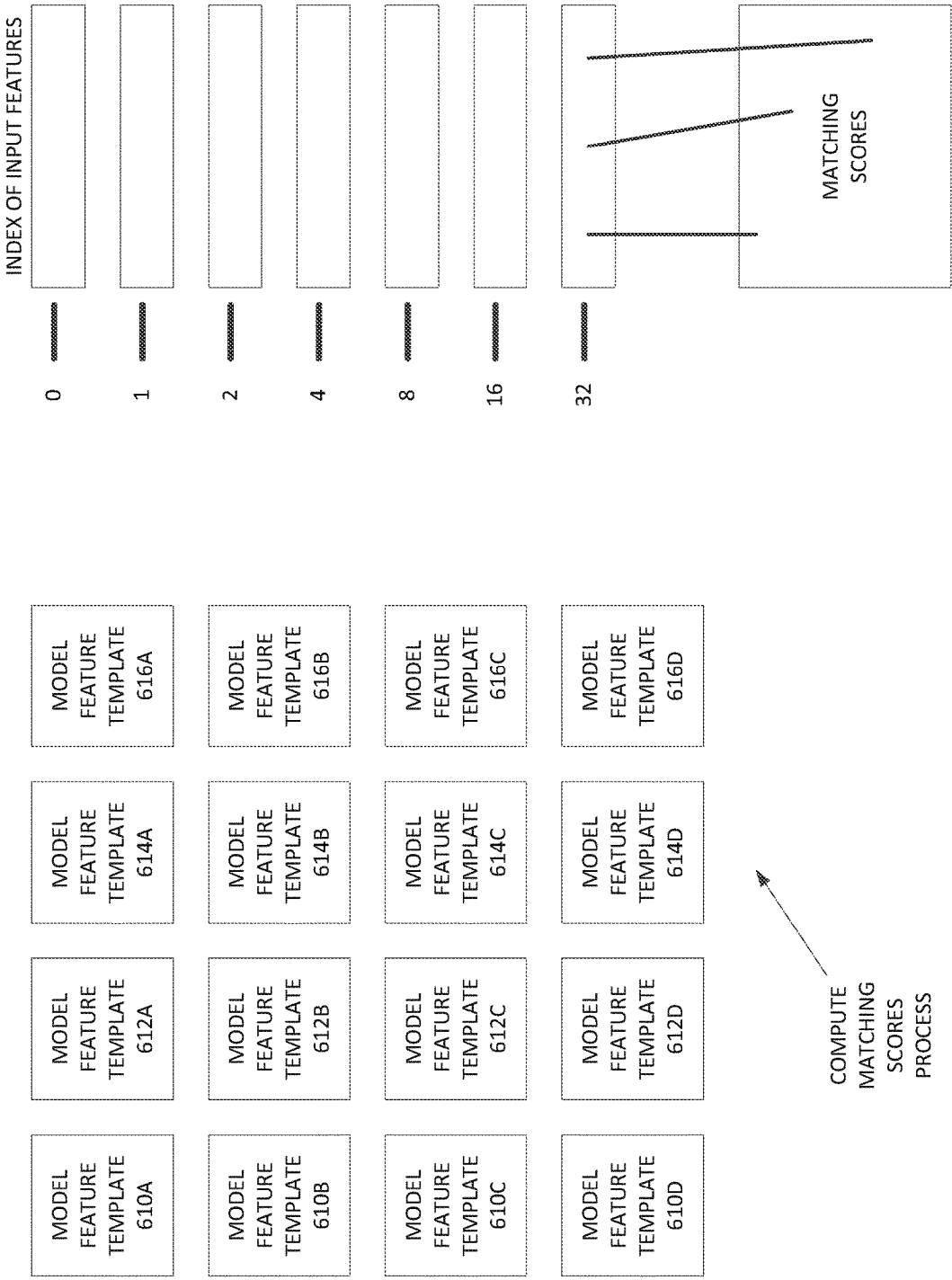
FIG. 27 illustrates another exemplary matching technique.

Referring to FIG. 27, a set of different model images 610A-D, 612A-D, 614A-D, 616A-D, may be matched in an efficient manner, where each of images is preferably a different view or angular orientation of the same model image, together with defined spatial regions that are discriminative in nature. In this manner, each of the spatial regions of each of the model images may be processed in a manner consistent with that described with respect to FIG.

25. In some cases it is desirable to process each of the model feature templates 610A-610D, then each of the model feature templates 612A-612D, then each of model feature template 614A-614D, etc., in a sequential order. In some cases it is desirable to process each of the model feature templates 610A, 612A, 614A, 616A, then each of the model feature templates 610B, 612B, 614B, 616B, then each of the model feature templates 610C, 612C, 614C, 614D, etc., in a sequential order. Therefore, the system may efficiently determine matches for different representations of the model image in an efficient manner.

Figure 28:
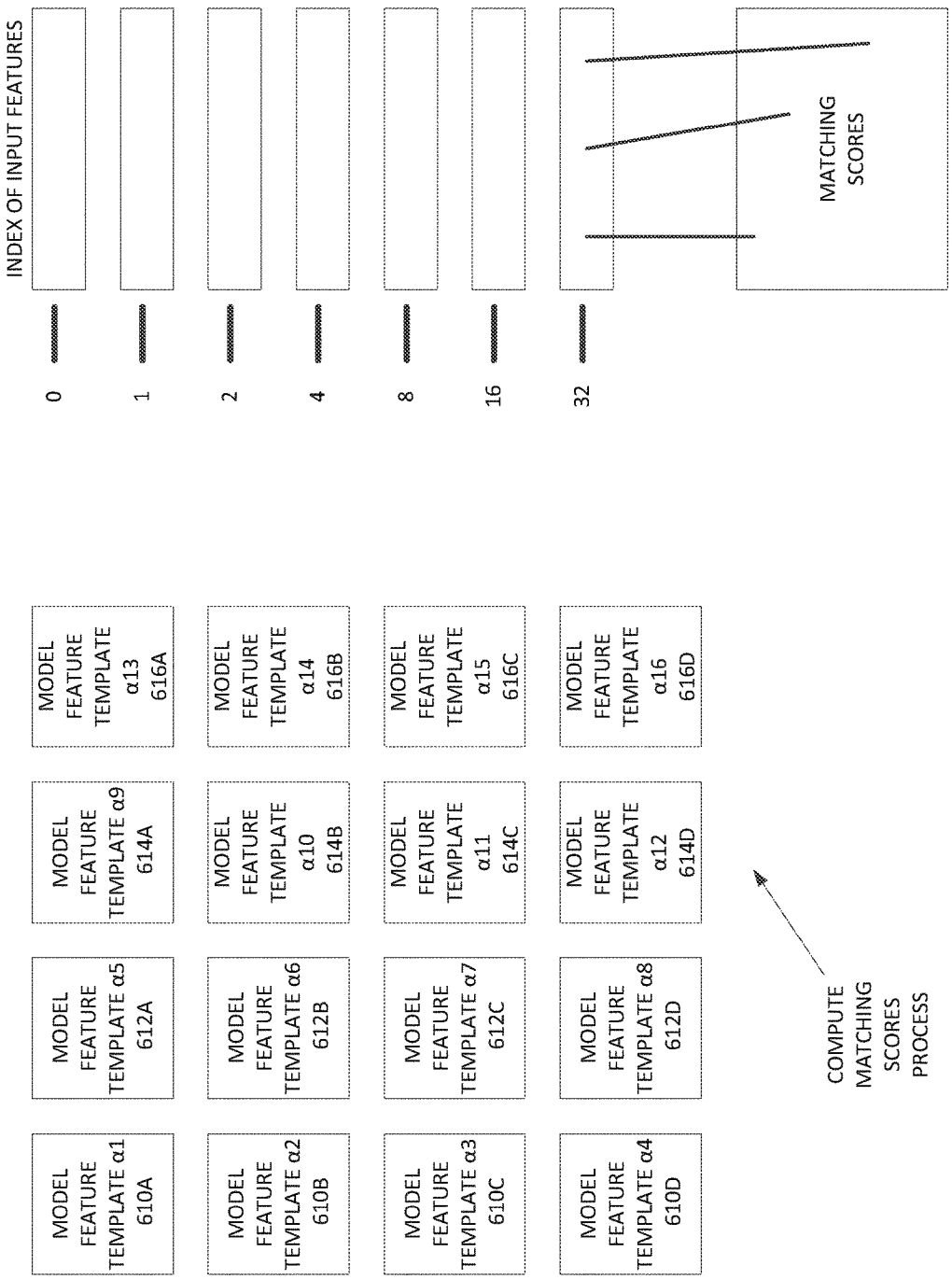
FIG. 28 illustrates another exemplary matching technique.

Referring to FIG. 28, a set of different model images 610A-D, 612A-D, 614A-D, 616A-D, may be matched in an efficient manner, where each of images is preferably a different view or angular orientation of the same model image together with defined spatial regions that are discriminative in nature together with weightings. In this manner, each of the spatial regions of each of the model images may be processed in a manner consistent with that described with respect to FIG. 26. In some cases it is desirable to process each of the model feature templates 610A-610D, then each of the model feature templates 612A-612D, then each of model feature template 614A-614D, etc., in a sequential order. In some cases it is desirable to process each of the model feature templates 610A, 612A, 614A, 616A, then each of the model feature templates 610B, 612B, 614B, 616B, then each of the model feature templates 610C, 612C, 614C, 6140, etc., in a sequential order. Therefore, the system may efficiently determine matches for different representations of the model image in an efficient manner.

In some embodiments, each of the spatial regions for a model image, or the cumulative number of spatial regions for the model image, may be processed until a predetermined time limitation has been reached, so that an overall processing time may be controlled. The model feature templates may be processed in any order, as desired. The order of processing may be based, for example, to facilitate limited processing time and/or limited computational resources. In some cases, when multiple model images are processed, some of the model images may be different views of the same object. In some cases, when multiple model images are processed, some of the model images may be associated with different objects.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for image processing on a computing device, said method comprising:
 (a) labeling edge pixels of a model image using an edge based technique, where said model image includes a plurality of spatial regions each of which comprising at least one pixel, where said plurality of spatial regions are arranged in a manner from more discriminative of features of said model image to less discriminative of features of said model image;
 (b) specifying an angular orientation for each of said edge pixels of said model image for each of said spatial regions;
 (c) labeling edge pixels of an input image using an edge based technique;
 (d) specifying an angular orientation for each of said edge pixels of said input image;
 (e) indexing each of said angular orientations for each of said edge pixels of said input image into a feature index identifying its respective location;
 (f) determining candidate locations of an object within said input image based on said feature index and said angular orientation for each of said edge pixels of a first one of said spatial regions of said model image;
 (g) repeating step (f) for another one of said spatial regions of said model image until at least one of:
  (i) a candidate location is identified with a sufficiently strong match;
  (ii) a sufficient number of candidate locations are determined to have a sufficiently weak match;
  (iii) a predetermined time period has elapsed for determining candidate locations.

2. The method of claim 1 wherein said repeating step (f) for another one of said spatial regions of said model image is until said candidate location is identified with said sufficiently strong match.

3. The method of claim 1 wherein said repeating step (f) for another one of said spatial regions of said model image is until said sufficient number of candidate locations are determined to have said sufficiently weak match.

4. The method of claim 1 wherein said repeating step (f) for another one of said spatial regions of said model image is until said predetermined time period has elapsed for determining candidate locations.

5. The method of claim 1 wherein said determining candidate locations of said object within said input image based on said feature index and said angular orientation for each of said edge pixels for said first one of said spatial regions of said model image is further based upon different weightings of different portions of said spatial regions of said model image.

6. The method of claim 1 wherein said determining candidate locations and repeating of said determining candidate locations is also performed for another said model image.

7. The method of claim 6 wherein said another said model image is a transformation of said model image.

8. The method of claim 7 wherein said transformation is an affine transformation.

9. A method for image processing on a computing device, said method comprising:
 (a) labeling edge pixels of a first model image using an edge based technique, where said first model image includes a plurality of spatial regions each of which comprising at least one pixel, where said plurality of spatial regions are arranged in a manner from more discriminative of features of said first model image to less discriminative of features of said first model image;
 (b) labeling edge pixels of a second model image using an edge based technique, where said second model image includes a plurality of spatial regions each of which comprising at least one pixel, where said plurality of spatial regions are arranged in a manner from more discriminative of features of said second model image to less discriminative of features of said second model image;
 (c) specifying an angular orientation for each of said edge pixels of first said model image for each of said spatial regions;
 (d) specifying an angular orientation for each of said edge pixels of said second model image for each of said spatial regions;

(e) labeling edge pixels of an input image using an edge based technique;
(f) specifying an angular orientation for each of said edge pixels of said input image;
(g) indexing each of said angular orientations for each of said edge pixels of said input image into a feature index identifying its respective location;
(h) determining candidate locations of an object within said input image based on said feature index and said angular orientation for each of said edge pixels of a first one of said spatial regions of said first model image;
(i) determining candidate locations of an object within said input image based on said feature index and said angular orientation for each of said edge pixels of a first one of said spatial regions of said second model image;
(j) repeating steps (h) and (i), in a sequential manner, for another one of said spatial regions of said model image until at least one of:
   (i) a candidate location is identified with a sufficiently strong match to either said first model image or said second model image;
   (ii) a sufficient number of locations are determined to have a sufficiently weak match for any model image;
   (iii) a predetermined time period has elapsed for determining candidate locations.

10. The method of claim 9 wherein said repeating steps (h) and (i) for another one of said spatial regions of said first and second model images until said candidate location is identified with said sufficiently strong match.

11. The method of claim 9 wherein said repeating steps (h) and (i) for another one of said spatial regions of said first and second model images until said sufficient number of candidate locations are determined to have said sufficiently weak match.

12. The method of claim 9 wherein said repeating steps (h) and (i) for another one of said spatial regions of said first and second model images until said predetermined time period has elapsed for determining candidate locations.

13. The method of claim 9 wherein said determining candidate locations of said object within said input image based on said feature index and said angular orientation for each of said edge pixels for said first one of said spatial regions of said first and second model images is further based upon different weightings of different portions of said spatial regions of said first and second model images.

* * * * *